(12) United States Patent
Lee

(10) Patent No.: US 11,404,054 B2
(45) Date of Patent: Aug. 2, 2022

(54) HOME APPLIANCE AND METHOD FOR VOICE RECOGNITION THEREOF

(71) Applicant: Samsung Electronics Co., Ltd., Suwon-si (KR)

(72) Inventor: Nokhaeng Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 16/726,031

(22) Filed: Dec. 23, 2019

(65) Prior Publication Data

US 2020/0211539 A1 Jul. 2, 2020

(30) Foreign Application Priority Data

Dec. 27, 2018 (KR) .................. 10-2018-0170469

(51) Int. Cl.
| | |
|---|---|
| *G10L 15/20* | (2006.01) |
| *G10L 15/22* | (2006.01) |
| *G10L 25/84* | (2013.01) |
| *G10L 21/0232* | (2013.01) |

(52) U.S. Cl.
CPC .............. *G10L 15/20* (2013.01); *G10L 15/22* (2013.01); *G10L 21/0232* (2013.01); *G10L 25/84* (2013.01); *G10L 2015/223* (2013.01)

(58) Field of Classification Search
CPC ........................... G10L 21/0208; G10L 15/20
See application file for complete search history.

(56) References Cited

U.S. PATENT DOCUMENTS

| | | | |
|---|---|---|---|
| 5,563,954 A | 10/1996 | Ono et al. | |
| 7,310,603 B2 | 12/2007 | Park et al. | |
| 8,345,890 B2 * | 1/2013 | Avendano | G10L 21/0208 381/94.3 |
| 9,379,751 B2 | 6/2016 | Liu et al. | |
| 10,602,268 B1 * | 3/2020 | Soto | G10L 25/84 |
| 2003/0037382 A1 * | 2/2003 | Broker | D06F 33/48 8/158 |
| 2003/0040908 A1 * | 2/2003 | Yang | H04R 3/005 704/233 |

(Continued)

FOREIGN PATENT DOCUMENTS

| | | | |
|---|---|---|---|
| JP | 2010-217453 A | 9/2010 | |
| JP | 5568694 B2 | 8/2014 | |

(Continued)

OTHER PUBLICATIONS

European Search Report for EP19904108, a corresponding application in the EPO. (Year: 2021).*

(Continued)

*Primary Examiner* — Jialong He

(57) ABSTRACT

A home appliance including a communication device configured to communicate with another home appliance, a microphone configured to receive a voice from a user, and a processor configured to perform signal processing on first voice data obtained from the microphone and perform voice recognition using the signal-processed first voice data. Wherein the processor generates noise data using second voice data received from the other home appliance and performs the signal processing on the first voice data using the generated noise data.

14 Claims, 21 Drawing Sheets

(56) References Cited

U.S. PATENT DOCUMENTS

| | | | |
|---|---|---|---|
| 2013/0262101 A1* | 10/2013 | Srinivasan | G10L 21/0208 704/226 |
| 2015/0287414 A1 | 10/2015 | Tsujikawa | |
| 2016/0063997 A1* | 3/2016 | Nemala | G10L 25/06 704/233 |
| 2016/0253995 A1* | 9/2016 | Zhou | G10L 21/02 704/233 |
| 2016/0316293 A1* | 10/2016 | Klimanis | H04R 3/00 |
| 2017/0004828 A1* | 1/2017 | Lee | G10L 13/033 |
| 2017/0084286 A1* | 3/2017 | Kim | G10L 21/0216 |
| 2017/0229137 A1 | 8/2017 | Osako et al. | |
| 2018/0012585 A1* | 1/2018 | Qiao | G10K 11/178 |
| 2018/0096696 A1* | 4/2018 | Mixter | G10L 15/20 |
| 2018/0233147 A1 | 8/2018 | Tukka et al. | |
| 2018/0234760 A1* | 8/2018 | Chen | H04R 1/086 |
| 2018/0350357 A1 | 12/2018 | Pandey et al. | |
| 2018/0350379 A1 | 12/2018 | Wung et al. | |

FOREIGN PATENT DOCUMENTS

| | | |
|---|---|---|
| JP | 2016-042132 A | 3/2016 |
| JP | 2017-064064 A | 4/2017 |
| KR | 10-0413797 B1 | 12/2003 |
| KR | 10-0446626 B1 | 9/2004 |
| KR | 10-0474340 B1 | 3/2005 |
| KR | 10-0913197 B1 | 8/2009 |
| KR | 10-1832952 B1 | 2/2018 |
| KR | 10-2018-0093363 A | 8/2018 |
| KR | 10-2018-0127100 A | 11/2018 |

OTHER PUBLICATIONS

International Search Report and Written Opinion of the International Searching Authority in connection with International Application No. PCT/KR2019/018113 dated Apr. 10, 2020, 9 pages.

Supplementary European Search Report dated Sep. 27, 2021, in connection with European Application No. 19904108.8, 9 pages.

* cited by examiner

HOME APPLIANCE AND METHOD FOR VOICE RECOGNITION THEREOF

CROSS-REFERENCE TO RELATED APPLICATION

This application claims priority from Korean Patent Application No. 10-2018-0170469, filed on Dec. 27, 2018 in the Korean Intellectual Property Office, the disclosure of which is incorporated herein by reference in its entirety.

BACKGROUND

1. Field

Apparatuses and methods consistent with the disclosure relate to a home appliance and a method for voice recognition thereof, and more particularly, to a home appliance which estimates noise using information on noise that occurs in another home appliance and reduces the estimated noise to increase a voice recognition rate, and a method for voice recognition thereof.

2. Description of the Related Art

Home appliances may perform various functions according to control commands from users. Recently, home appliances employ a voice recognition function to receive a control command through a user voice, as well as receiving a control command via an input device such as a keypad, a remote controller, and the like.

In particular, home appliances to which a method of activating a voice recognition function based on a specific start command (e.g., Bixby) when a user speaks the specific start command has been increasingly adopted.

Recently, it is common for a household to have and use a plurality of home appliances. Here, if large magnitude noise is produced in a home appliance, a voice recognition function of another home appliance may not operate smoothly due to the noise.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a home appliance which estimates noise using information on noise produced in another home appliance and reduces the estimated noise to increase a voice recognition rate, and a method for voice recognition thereof.

According to an embodiment of the disclosure, a home appliance includes: a communication device configured to communicate with another home appliance; a microphone configured to receive a voice from a user; and a processor configured to perform signal processing on first voice data obtained from the microphone and perform voice recognition using the signal-processed first voice data, wherein the processor generates noise data using second voice data received from the other home appliance and performs the signal processing on the first voice data using the generated noise data.

According to another embodiment of the disclosure, a method for voice recognition of a home appliance includes: obtaining first voice data from a microphone; performing signal processing on the obtained first voice data; and performing voice recognition using the signal-processed first voice data, wherein the performing of signal processing includes: receiving second voice data from another home appliance; generating noise data using the received second voice data; and performing signal processing on the first voice data using the generated noise data.

According to another embodiment of the disclosure, a recording medium storing a program for performing a method for voice recognition, in which the method includes: requesting voice data from a first home appliance and a second home appliance; receiving first voice data and second voice data respectively obtained from the first home appliance and the second home appliance based on the request; generating noise data using the received second voice data; performing signal processing on the first voice data using the generated noise data; and transmitting the signal-processed first voice data to the first home appliance.

Additional and/or other aspects and advantages of the disclosure will be set forth in part in the description which follows and, in part, will be obvious from the description, or may be learned by practice of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
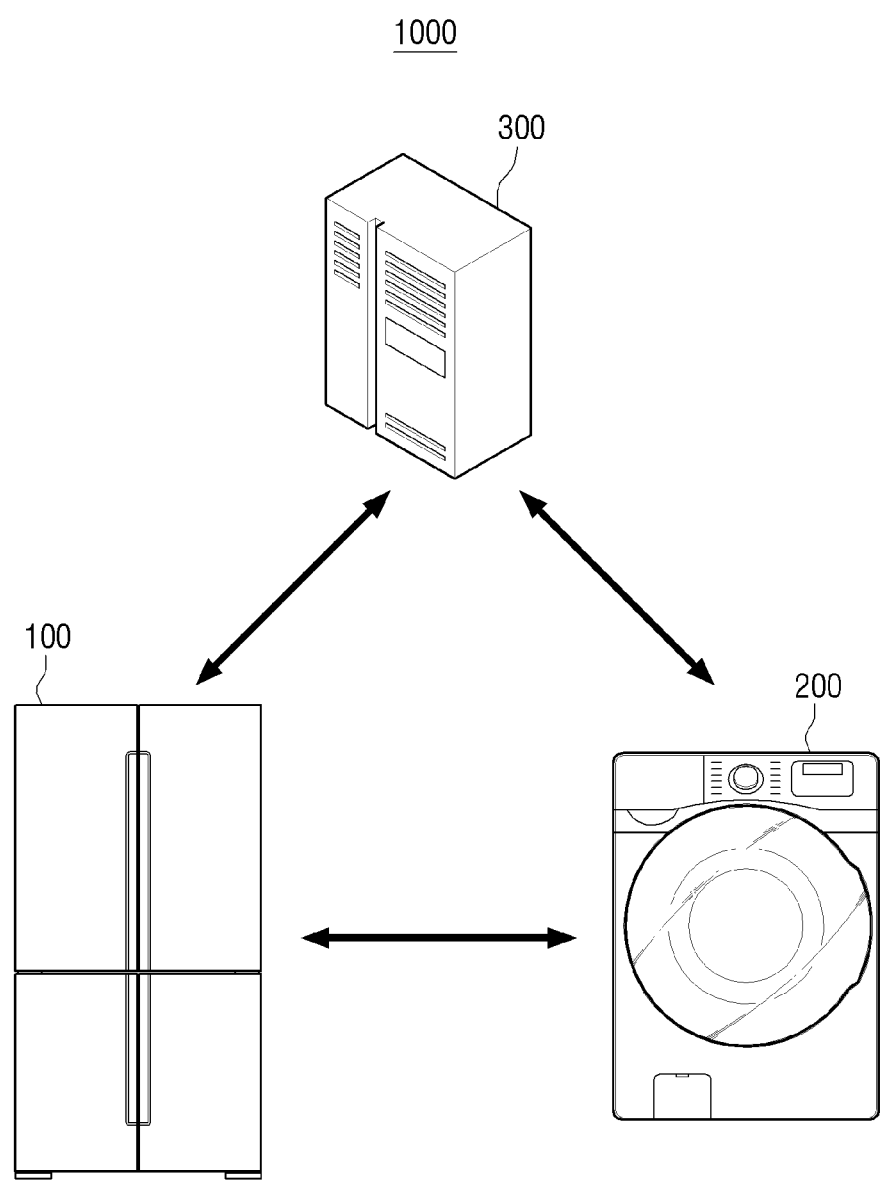
FIG. 1 illustrates a block diagram of a voice recognition system according to an embodiment of the disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the description of the various embodiments of the disclosure are briefly described and then the various example embodiments of the disclosure will be described in greater detail.

The terms used in the example embodiments of the disclosure are general terms which are widely used now and selected considering the functions of the disclosure. However, the terms may vary depending on the intention of a person skilled in the art, a precedent, or the advent of new technology. In addition, in a specified case, the term may be arbitrarily selected. In this case, the meaning of the term will be explained in the corresponding description. Therefore, terms used in the disclosure may be defined based on a meaning of the terms and contents described in the disclosure, not simply based on names of the terms.

Hereinafter, various embodiments of the disclosure are described with reference to the accompanying drawings. However, it should be appreciated that the disclosure is not limited to a specific embodiment and all modifications, equivalents and/or alternatives thereof also belong to the scope of the disclosure. Descriptions of well-known functions and structures incorporated herein may be omitted to avoid obscuring the subject matter of the disclosure.

In the disclosure, terms including an ordinal number such as 'first', 'second', etc. may be used to describe various components, but the components are not to be construed as being limited to the terms. The terms are only used to differentiate one component from other components.

In the description, the singular forms are intended to include the plural forms as well, unless the context clearly indicates otherwise. It will be understood that the terms "comprising", "including", "having" and variants thereof specify the presence of stated features, numbers, steps, operations, elements, components, and/or groups thereof, but do not preclude the presence or addition of one or more other features, numbers, steps, operations, elements, components, and/or groups thereof.

Hereinafter, embodiments will be described in detail with reference to the accompanying tables and drawings such that they can be easily practiced by those skilled in the art to which the disclosure pertains. As those skilled in the art would realize, the described embodiments may be modified in various different ways, all without departing from the spirit or scope of the disclosure. In the accompanying drawings, a portion irrelevant to description of the disclosure will be omitted for clarity. Like reference numerals refer to like elements throughout.

Hereinafter, the disclosure will be described in detail with reference to the accompanying drawings.

FIG. 1 is a diagram illustrating a voice recognition system according to an embodiment of the disclosure.

Referring to FIG. 1, a voice recognition system 1000 includes a first home appliance 100, a second home appliance 200, and a server 300.

The first home appliance 100 and the second home appliance 200 are electric machine tools used in a home, and include a robot cleaner, a vacuum cleaner, an electric range, a gas range, an electric wave oven, a range hood, a washing machine, a dryer, a refrigerator, a dishwasher, an air conditioner, and the like.

The first home appliance 100 and the second home appliance 200 may perform a voice recognition function and perform a function according to a voice recognition result. Here, voice recognition refers to a technique of converting an acoustic signal of an input speech into a word or sentence.

In addition, the first home appliance 100 and the second home appliance 200 may detect a user speaking voice and perform voice recognition on the detected voice. Specifically, when a wake up word (WUW) which is a trigger voice command for activating the voice recognition function is detected, the first home appliance 100 and the second home appliance 200 activate the voice recognition function and perform voice recognition using voice data of a voice input thereafter.

Hereinafter, for ease of explanation, it is assumed that the first home appliance 100 performs a voice recognition function. Here, the second home appliance 200 may be a home appliance that produces large magnitude noise. Specifically, the second home appliance 200 may produce large magnitude noise due to a motor, a fan, or the like included therein.

In addition, due to the large magnitude noise produced in the second home appliance 200, the voice recognition function of the first home appliance 100 may not operate properly. Therefore, the first home appliance 100 may estimate the noise using information on the large magnitude noise produced in the second home appliance 200 and reduce the estimated noise to increase a voice recognition rate.

To this end, the first home appliance 100 may transmit a recording request signal to the second home appliance 200. In addition, the first home appliance 100 may receive second voice data obtained based on the recording request signal from the second home appliance 200. Here, the second voice data is voice data regarding noise produced in the second home appliance 200.

In addition, the first home appliance 100 may obtain first voice data based on the recording request signal.

Accordingly, the first home appliance 100 may obtain first voice data and second voice data of the voice detected at the same time.

In addition, the first home appliance 100 may generate noise data using the second voice data. Here, the noise data refers to sound data corresponding to pure noise of a noise source. Specifically, the first home appliance 100 may generate the noise data by applying the second voice data to a noise path estimation filter. A specific operation of generating noise data will be described later with reference to FIGS. 6 through 10.

In addition, the first home appliance 100 may signal-process the first voice data using the generated noise data. Specifically, the first home appliance 100 may remove noise included in the first voice data using the generated noise data.

In addition, the first home appliance 100 may perform voice recognition using the first signal-processed voice data.

The second home appliance 200 may be connected to the first home appliance 100 through wired or wireless communication. The second home appliance 200 may receive a recording request signal from the first home appliance 100.

In addition, the second home appliance 200 may obtain second voice data based on the received recording request signal. The obtained second voice data may be transmitted to the first home appliance 100.

Meanwhile, the recording request signal transmission operation and the signal processing operation on the first voice data of the first home appliance 100 may also be performed by the server 300.

Specifically, the server 300 may be connected to the first home appliance 100 and the second home appliance 200 through wired or wireless communication. The server 300 may transmit a recording request signal to the first home appliance 100 and the second home appliance 200.

In addition, the server 300 may receive first voice data obtained based on the recording request signal from the first home appliance 100. The server 300 may receive second voice data obtained based on the recording request signal from the second home appliance 200.

In addition, the server 300 may generate noise data using the second voice data. Specifically, the server 300 may generate the noise data by applying the second voice data to the noise path estimation filter.

The server 300 may signal-process the first voice data using the generated noise data. The server 300 may transmit the signal-processed first voice data to the first home appliance 100.

Meanwhile, in FIG. 1, it is illustrated and described that the first home appliance 100 is connected to one second home appliance 200, but it may also be implemented such that the first home appliance 100 is connected to a plurality of home appliances and perform signal processing using information on noise produced in the plurality of home appliances.

In addition, in FIG. 1, it is illustrated and described that the server 300 is connected to two home appliances, but it may also be implemented such that the server 300 is connected to three or more home appliances.

In addition, in FIG. 1, it is illustrated and described that the server 300 is included in the voice recognition system 1000, but only the first home appliance 100 and the second home appliance 200 may be implemented without the server 300.

Figure 2:
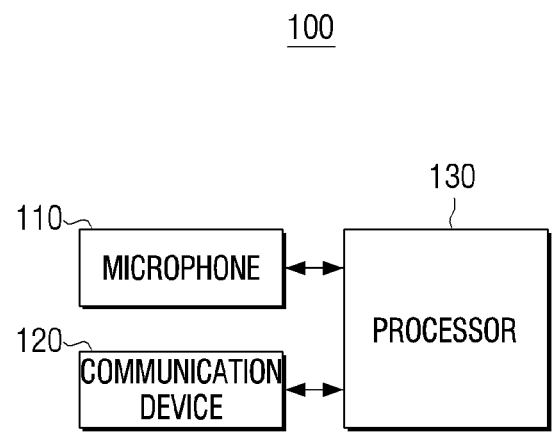
FIG. 2 is a block diagram illustrating a simple configuration of a first home appliance according to an embodiment of the disclosure.

FIG. 2 is a block diagram illustrating a simple configuration of a first home appliance according to an embodiment of the disclosure.

Referring to FIG. 2, the first home appliance 100 may include a microphone 110, a communication device 120, and a processor 130.

The microphone 110, a device that converts sound into a sound signal, may output a user's spoken voice and a surrounding sound as voice data. The microphone 110 may deliver the output voice data to the processor 130.

The microphone 110 may be disposed on a surface of the housing. Specifically, the microphone 110 may be disposed on a surface of the housing to generate first voice data corresponding to a sound near the first home appliance 100 in order to collect the user's spoken voice. In addition, an arrangement position of the microphone 110 is not limited to the example described above.

In addition, in the disclosure, it is illustrated and described that the first home appliance 100 includes one microphone, but the first home appliance 100 may include two or more microphones when implemented.

The communication device 120 may be connected to an external device and may receive various data from the external device. Specifically, the communication device 120 may be connected to an external device through a local area network (LAN) and the Internet, as well as through a universal serial bus (USB) port or a wireless communication (e.g., Wi-Fi 802.11a/b/g/n, NFC, Bluetooth). Here, the external device may be a PC, a notebook, a smartphone, a server, or the like.

In addition, the communication device 120 may be connected to the second home appliance 200 or the server 300 in the voice recognition system 1000. For example, the communication device 120 may communicate with the second home appliance 200 in the voice recognition system 1000 through Bluetooth communication and communicate with the server 300 in the voice recognition system 1000 through Wi-Fi communication. Meanwhile, the method for the first home appliance 100 to communicate with the second home appliance 200 or the server 300 is not limited to the example described above.

The processor 130 controls the first home appliance 100. Specifically, the processor 130 may control each component of the first home appliance 100 according to a user's control command. For example, when the first home appliance 100 is a refrigerator, the processor 130 may control an operation of a compressor to provide cooled air to a cooling chamber containing food based on a cooling command being received.

In addition, the processor 130 may perform voice recognition using first voice data obtained through the microphone 110. Meanwhile, the first voice data may include noise as well as a user's voice, and a voice recognition rate may be lowered by the contained noise.

Accordingly, the processor 130 may perform preprocessing on the first voice data. Here, the preprocessing is a series of signal processing performed before voice recognition and may remove noise included in the voice data. In addition, the processor 130 may perform voice recognition using the preprocessed first voice data.

Meanwhile, the noise included in the first voice data may be due to the second home appliance 200 disposed near the first home appliance 100 and producing large magnitude noise. Therefore, the processor 130 obtains information on the noise produced in the second home appliance 200 from the second home appliance 200 and preprocesses the first voice data using the obtained information on the noise.

Hereinafter, an operation of performing preprocessing on the first voice data using the information on the noise produced in the second home appliance 200 will be described in detail.

First, the processor 130 may control the communication device 120 to detect another connectable home appliance. Specifically, the processor 130 may control the communication device 120 to detect the second home appliance connectable through short-range wireless communication or the second home appliance 200 connected to an access point (AP) to which the first home appliance 100 is connected.

Here, the second home appliance 200 available for short-range wireless communication with the first home appliance 100 or connected to the AP to which the first home appliance 100 is connected is expected to be disposed near the first home appliance 100. Therefore, it may be inferred that the noise produced in the second home appliance 200 may affect the voice recognition function of the first home appliance 100.

In addition, the processor 130 may control the communication device 120 to request transmission of voice data from the second home appliance 200. Specifically, the processor 130 may control the communication device 120 to transmit a recording request signal for requesting generation and transmission of second voice data, which is voice data of the noise produced in the second home appliance 200, to the second home appliance 200.

Here, the recording request signal may include information on a predetermined time. The second home appliance 200 may detect noise using a microphone and generate second voice data at a predetermined time based on the received recording request signal. For example, when information on the predetermined time included in the recording request signal is 3:00:30 p.m., the second home appliance 200 may detect noise using the microphone at 3:00:30 p.m. and generate second voice data.

Meanwhile, the information on the predetermined time may be implemented to include absolute time information as in the example described above and may be implemented to include relative time information such as "x seconds after the recording request signal is received".

In addition, the recording request signal may include information on the predetermined time length of the second voice data. The second home appliance 200 may generate second voice data having a predetermined time length based on the received recording request signal. For example, when the information on the predetermined time length included in the recording request signal is 3 seconds, the second home appliance 200 may generate second voice data having a length of 3 seconds.

Meanwhile, the information that may be included in the recording request signal is not limited to the example described above.

In addition, the processor 130 may receive second voice data generated based on the request transmitted to the second home appliance 200 from the second home appliance 200. Specifically, the processor 130 may receive the second voice data generated based on the predetermined time information and the predetermined time length information included in the recording request signal from the second home appliance 200.

For example, when the predetermined time information included in the recording request signal is 3:00:30 p.m. and the predetermined time length information is 2 seconds, the processor 130 may receive the second voice data regarding the voice detected through the microphone of the second home appliance 200 from 3:00:30 p.m. to 3:00:32 p.m.

In addition, the processor 130 may obtain first voice data based on the request transmitted to the second home appliance 200. Specifically, the processor 130 may obtain first voice data based on the predetermined time information and predetermined time length information included in the recording request signal transmitted to the second home appliance 200.

For example, when the predetermined time information included in the recording request signal is 3:00:30 p.m. and the predetermined time length information is 2 seconds, the processor 130 may obtain the first voice data regarding the voice detected through the microphone 110 from 3:00:30 p.m. to 3:00:32 p.m.

Here, the first voice data and the second voice data being obtained are generated based on the recording request signal, and thus correspond to voice data detected by the first home appliance 100 and the second home appliance 200 at the same time, respectively. The second voice data is voice data for noise directly detected in the second home appliance 200, and thus may include a noise having a magnitude larger than that included in the first voice data.

Accordingly, when the second voice data is used, the noise included in the first voice data may be more accurately extracted than when only the first voice data is used.

In addition, the processor 130 may generate noise data which is sound data corresponding to pure noise of a noise source in the second home appliance 200 using the second voice data.

The processor 130 may use a noise path estimation filter to generate noise data. Here, the noise path estimation filter refers to a filter for filtering components other than the noise of the noise source included in the second voice data. Here, the noise path estimation filter may be referred to as a filtering algorithm.

For example, when the second voice data is input to the noise path estimation filter, a user's speech component included in the second voice data may be filtered to output noise data. Meanwhile, a specific operation of generating noise data using the noise path estimation filter will be described later with reference to FIGS. 6 through 10.

In addition, the processor 130 may use a pre-stored noise path estimation filter or receive a noise path estimation filter from an external device, and generate noise data using the received noise path estimation filter. Meanwhile, a specific operation of receiving the noise path estimation filter from outside and generating noise data will be described later with reference to FIGS. 11 through 13.

The processor 130 may perform preprocessing on the first voice data using the noise data. Specifically, the processor 130 may perform preprocessing on the first voice data by removing a component corresponding to noise of the noise source from the first voice data using the noise data generated through the noise path estimation filter.

The operations of the processor 130 may be repeatedly performed according to a predetermined period. Specifically, the processor 130 may perform a sequential operation of requesting voice data from the second home appliance 200, receiving second voice data obtained based on the request from the second home appliance 200, obtaining first voice data corresponding to the request, generating noise data using the received second voice data, and performing preprocessing on the first voice data using the generated noise data, according to a predetermined period.

Meanwhile, the processor 130 may change the preprocessing method for the first voice data according to whether noise is produced in the second home appliance 200 at present.

For example, it is assumed that a sound generated in the second home appliance 200 is produced by a motor included in the second home appliance 200. In this case, the processor 130 may change the preprocessing method for the first voice data according to whether the motor of the second home appliance 200 is driven.

Specifically, the processor 130 may control the communication device 120 to determine whether the motor of the second home appliance 200 is driven. If the motor of the second home appliance 200 is driven, the noise produced in the second home appliance 200 is large in magnitude, and thus, preprocessing may be performed on the first voice data using the second voice data according to the method described above.

Meanwhile, when the motor of the second home appliance 200 is not driven, there is no noise produced in the second home appliance 200 itself, and thus, voice recognition may be immediately performed using the first voice data without using the second voice data or preprocessing may be performed on the first voice data according to the method of the related art.

Meanwhile, even when the noise source of the second home appliance 200 is a fan or the like, instead of the motor, the processor 130 may change the preprocessing method for the first voice data according to whether the noise source is driven.

The processor 130 may perform voice recognition using the preprocessed first voice data.

Meanwhile, in FIG. 2, it is illustrated and described that the first home appliance performs the operation of transmitting the recording request signal to the second home appliance 200, receiving the second voice data from the second home appliance 200, and performing preprocessing on the first voice data, but it may be implemented such that the server 300 instead of the first home appliance 100 performs the operation described above and the first home appliance 100 simply receives preprocessed first voice data from the server 300 and performs voice recognition. A specific operation thereof will be described later with reference to FIG. 5.

In addition, although only the simple components configuring the first home appliance has been illustrated and described above, various components may be further provided at the time of implementation. This will be described below with reference to FIG. 3.

Figure 3:
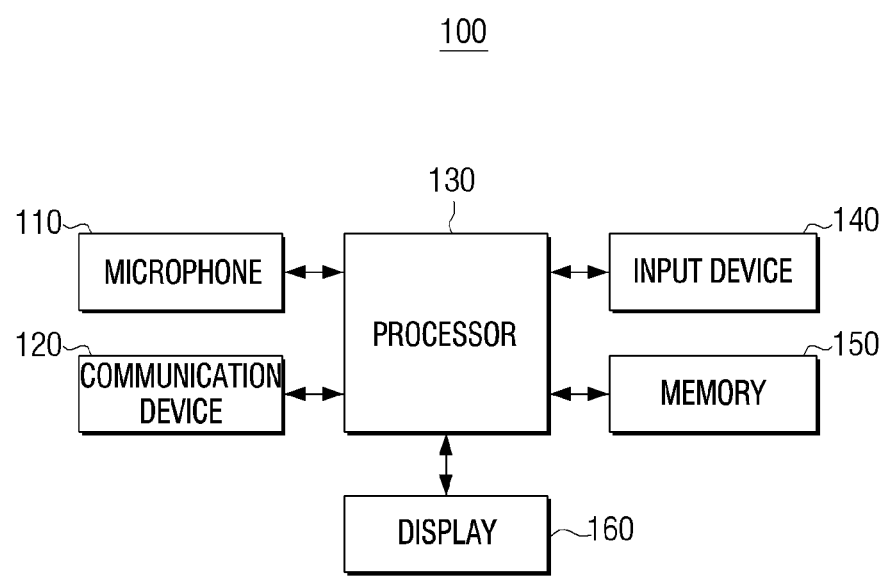
FIG. 3 is a block diagram illustrating a specific configuration of a first home appliance according to an embodiment of the disclosure.

FIG. 3 is a block diagram illustrating a specific configuration of a first home appliance according to an embodiment of the disclosure.

Referring to FIG. 3, the first home appliance 100 according to an embodiment of the disclosure may include the microphone 110, the communication device 120, the processor 130, an input device 140, a memory 150, and a display 160.

The microphone 110 and the communication device 120 perform the same functions as those of FIG. 2, and thus redundant descriptions thereof will be omitted. Also, the processor 130 has been described above with reference to FIG. 2, and thus, the descriptions of FIG. 2 are not repeated and only the contents related to the components added to FIG. 3 will be described below.

The input device 140 may include a plurality of function keys for the user to set or select various functions supported by the first home appliance 100. Through this, the user may input various control commands for the first home appliance 100. For example, when the first home appliance 100 is a washing machine, the user may input a spin-dry command of the washing machine through the input device 140.

The memory 150 stores various data for an overall operation of the first home appliance 100, such as a program for processing or controlling the processor 130. Specifically, the memory 150 may store a plurality of application programs run in the first home appliance 100 and data and instructions for operating the first home appliance 100.

The memory 150 may be accessed by the processor 130, and data reading/writing/modifying/deleting/updating may be performed by the processor 130. The memory 150 may be implemented not only as a storage medium in the first home appliance 100 but also as an external storage medium, a removable disk including a USB memory, a web server through a network, and the like.

The memory 150 may store a noise path estimation filter necessary to generate noise data.

The display 160 may display various types of information provided by the first home appliance 100. Specifically, the display 160 may display an operation state of the first home appliance 100 or may display a user interface window for selecting a function and an option selected by the user.

For example, when the first home appliance 100 is a washing machine, the display 160 may display that the washing machine is performing a spin-dry operation or display an interface window allowing the user to select how many minutes the spin-dry function is to be operated. Alternatively, the display 160 may display a result of performing the voice recognition function or may display an interface window so that the user may change a setting for the voice recognition function.

In the related art, for preprocessing, a beamforming technology of obtaining a plurality of voice signals including a voice and noise through a plurality of microphones and separating the voice and the noise using features that the voice and noise are incident in different directions and frequency spectrums thereof are different is used to remove noise.

However, if a magnitude of noise is larger than that of a voice in an actual environment, it is difficult to recognize an expected directional difference or spectral difference, leading to a problem that it is difficult to distinguish between the voice and the noise in the related art method. For example, when large magnitude noise is produced from other home appliances arranged in the vicinity, it is difficult to sufficiently remove noise for voice recognition by the related art alone.

Meanwhile, as described above, the first home appliance according to the present embodiment obtains second voice data regarding the corresponding noise from another home appliance that produces large magnitude noise, and performs preprocessing using the obtained second voice data, whereby noise included in the voice data may be accurately removed even though a magnitude of the noise produced from outside is large.

Figure 4:
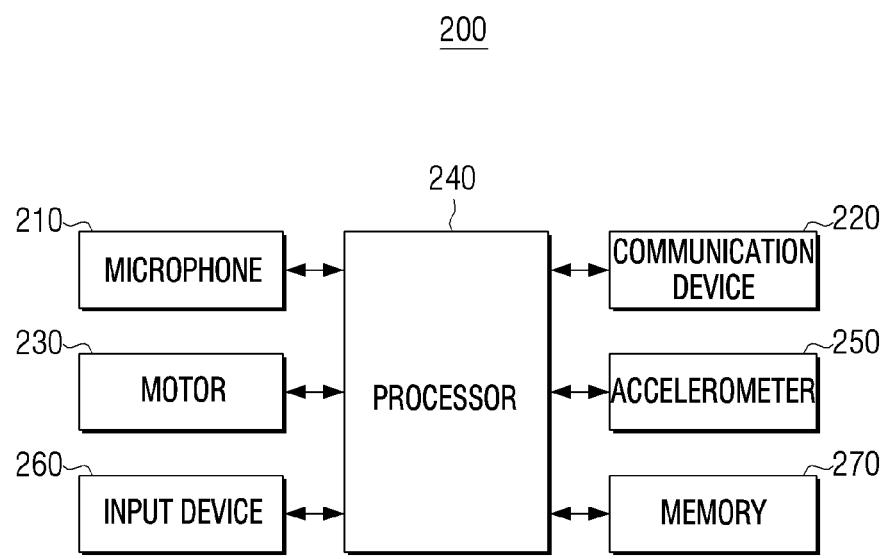
FIG. 4 is a block diagram illustrating a simple configuration of a second home appliance according to an embodiment of the disclosure.

FIG. 4 is a block diagram illustrating a simple configuration of a second home appliance according to an embodiment of the disclosure.

Referring to FIG. 4, the second home appliance 200 according to an embodiment of the disclosure may include a microphone 210, a communication device 220, a processor 240, a motor 230, an accelerometer 250, an input device 260, and a memory 270.

The microphone 210 is a device that converts a sound into a sound signal and may output a user's spoken voice and surrounding sounds as voice data. The microphone 210 may delivery the output voice data to the processor 240.

The microphone 210 may be disposed on a surface of the housing. Specifically, in order to collect the user's spoken voice, the microphone 210 may be disposed on the surface of the housing to generate second voice data corresponding to a sound around the second home appliance 200.

Alternatively, the microphone 210 may be disposed in the housing. Specifically, to collect a noise sound produced in the second home appliance 200 itself, the microphone 210 may be disposed inside the housing (specifically, near a noise source that produces noise such as a motor) to generate second voice data corresponding to the sound generated by the second home appliance 200.

Meanwhile, an arrangement position of the microphone 210 is not limited to the example described above. In addition, in the disclosure, although it is illustrated and described that the second home appliance 200 includes one microphone but the second home appliance 200 may include two or more microphones when implemented.

The communication device 220 may be connected to an external device and receive various data from the external device. Specifically, the communication device 220 may be connected to an external device through a local area network (LAN) and the Internet, as well as through a universal serial bus (USB) port or a wireless communication Wi-Fi 802.11a/b/g/n, NFC, Bluetooth) port. The external device may be a PC, a notebook, a smartphone, a server, or the like.

In addition, the communication device 220 may be connected to the first home appliance 100 or the server 300 in the voice recognition system 1000. For example, the communication device 220 may communicate with the first home appliance 100 in the voice recognition system 1000 through Bluetooth communication and communicate with the server 300 in the voice recognition system 1000 through Wi-Fi communication. Meanwhile, the method for the second home appliance 200 to communicate with the first home appliance 100 or the server 300 is not limited to the example described above.

The motor 230 is disposed in the second home appliance 200 to drive a component related to performing of a function of the second home appliance 200. For example, when the second home appliance 200 is a washing machine, the motor 230 may rotate a drum containing laundry at a high speed for spin-dry of the laundry. Here, vibration and noise may occur while the motor 230 starts the drum.

As another example, when the second home appliance 200 is a refrigerator, the motor 230 may start a refrigerant compressor that generates a refrigerant. Here, vibration and noise may be generated while the motor 230 starts the refrigerant compressor.

As described above, the motor 230 may be a noise source when the second home appliance 200 produces large magnitude noise by itself. Therefore, the microphone 210 may be disposed in the vicinity of the motor 230 and detect a sound produced by the motor 230 and generate second voice data corresponding thereto.

The processor 240 controls the second home appliance 200. Specifically, the processor 240 may control each component of the second home appliance 200 according to a control command of the user. For example, when the second home appliance 200 is a washing machine, the processor 240 may control the operation of the motor to provide a rotational force to the drum containing the laundry when a spin-dry command is received.

The processor 240 may receive a request for transmission of second voice data. Specifically, the processor 240 may receive a recording request signal requesting generation and transmission of the second voice data which is voice data regarding noise produced in the second home appliance 200 from the first home appliance 100 or the server 300 connected to the second home appliance 200.

In addition, the processor 240 may obtain second voice data based on the received request. Specifically, the processor 240 may detect noise using the microphone 210 based on the received recording request signal and obtain second voice data. More specifically, the processor 240 may obtain the second voice data based on information on a predetermined time and predetermined time length information included in the received recording request signal.

In addition, the processor 240 may control the communication device 220 to transmit the obtained second voice data. Specifically, the processor 240 may transmit the obtained second voice data to the first home appliance 100 or the server 300 connected to the second home appliance 200.

As such, the second voice data transmitted to the first home appliance 100 or the server 300 is voice data regarding noise produced in the second home appliance 200, and thus, may be used to perform preprocessing to remove the noise included in the first voice data obtained in the first home appliance 100.

For example, when a noise source of the second home appliance 200 is the motor 230, the first home appliance 100 or the server 300 may generate noise data which is pure motor noise data regarding the motor of the second home appliance 200 and perform preprocessing to remove the motor noise from the first voice data using the generated motor noise data.

Meanwhile, as described above, in addition to the method in which the processor 240 obtains the second voice data each time the recording request signal is received and transmits the obtained second voice data, the processor 240 may obtain the second voice data at each predetermined period when the recording request signal is received, and transmit the obtained second voice data as described above.

Meanwhile, in addition to the second voice data generated by detecting the noise produced in the second home appliance 200, the processor 240 may also provide other types of reference data regarding the noise to the first home appliance 100 or the server 300.

Here, the reference data may be data including information of the noise source. The information of the noise source may include a magnitude and phase of vibration produced from the noise source, a magnitude and phase of noise produced from the noise source, main frequency information, and the like.

For example, the processor 240 may generate noise data by obtaining reference data through the accelerometer 250 or by obtaining reference data through a control command input through the input device 260. A specific operation thereof will be described below.

The accelerometer 250 is a device for measuring acceleration of an object. In addition, the accelerometer 250 may be disposed in the vicinity of the motor 230 to measure acceleration of the motor 230 and generate information on the measured acceleration.

The processor 240 may extract an operating frequency of the motor 230 from the obtained acceleration information and generate reference data using the extracted operating frequency.

For example, when 50 Hz is extracted as the operating frequency of the motor 230 from acceleration information obtained from the accelerometer 250, the processor 240 may generate reference data represented by a trigonometric function having a specific size and phase using 50 Hz.

The input device 260 may include a plurality of function keys allowing the user to set or select various functions supported in the second home appliance 200. Through this, the user may input various control commands regarding the second home appliance 200.

Meanwhile, a control command input through the input device 260 may be related to driving of the motor 230. In this case, an operating frequency of the motor 230 corresponding to the control command input through the input device 260 may be checked.

For example, when the second home appliance 200 is a washing machine and a spin-dry command is input, the motor 230 may rotate the drum of the washing machine to perform a spin-dry function. In this case, it may be checked that the operating frequency of the motor 230 corresponding to the spin-dry command is 50 Hz.

The processor 240 may generate reference data using an operating frequency of the motor 230 corresponding to the control command.

This may be applied in the same manner to a control command generated by the processor 240 itself according to a situation determination.

In this manner, the processor 240 may transmit at least one of second voice data obtained through the microphone 210 and reference data generated using a driving frequency identified from the control command or the acceleration information of the accelerometer 250 to the first home appliance 100 or the server 300. In addition, the first home appliance 100 or the server 300 may generate noise data which is sound data corresponding to pure noise of the noise source in the second home appliance 200 using the received reference data.

Meanwhile, the processor 240 may not transmit the above-described second voice data and reference data to the first home appliance 100 or the server 300, and instead, the processor 240 may generate noise data using the second voice data and the reference data and transmit the generated noise data to the first home appliance 100 or the server 300. To this end, a noise path estimation filter may be previously stored in the second home appliance 200.

In this case, the first home appliance 100 or the server 300 may receive noise data and perform preprocessing to remove noise included in the first voice data using the received noise data.

The memory 270 stores various data for an overall operation of the second home appliance 200, such as a program for processing or controlling of the processor 240. Specifically, the memory 270 may store a plurality of application programs driven in the second home appliance 200 and data and instructions for the operation of the second home appliance 200.

For example, the memory 270 may store driving frequency information of the motor 230 corresponding to the control command input through the input device 260. The processor 240 may identify a driving frequency corresponding to the input control command and generate reference data using the identified driving frequency.

Meanwhile, although the noise source is illustrated and described as being the motor 230 in FIG. 4, but the noise source may be a fan or another component, not the motor 230 when implemented.

In addition, in FIG. 4, a single motor is illustrated and described, but a plurality of motors may be provided at the time of implementation, a plurality of motors may be provided, and noise may be estimated using reference data for each of the plurality of motors.

In addition, in FIG. 4, it is illustrated and described that the second home appliance includes both a microphone and an accelerometer, but only the accelerometer may be provided at the time of implementation and reference data may be obtained through the accelerometer. Alternatively, only the microphone may be provided and second voice data may be obtained through the microphone. Alternatively, the second microphone and the accelerometer may not be provided, and reference data may be obtained through an input device.

In addition, in FIG. 4, it is illustrated and described that the operation of generating the reference data using the operating frequency of the motor is performed by the processor, but a sine wave signal generator generating a sine wave signal upon receiving operating frequency information may be provided at the time of implementation. In this case, the signal generated by the sine wave signal generator may be used as reference data.

In addition, in FIG. 4, it is illustrated and described that the second home appliance 200 is a home appliance having a different configuration from that of the first home appliance 100, but the second home appliance 200 may be a home appliance having the same configuration as the first home appliance 100 at the time of implementation.

As described above, the second home appliance generates reference data regarding the noise of the internal noise source and provides the generated reference data to the first home appliance or the server so that the first home appliance or the server may perform preprocessing to remove noise included in voice data including user's speech by using the reference data.

Figure 5:
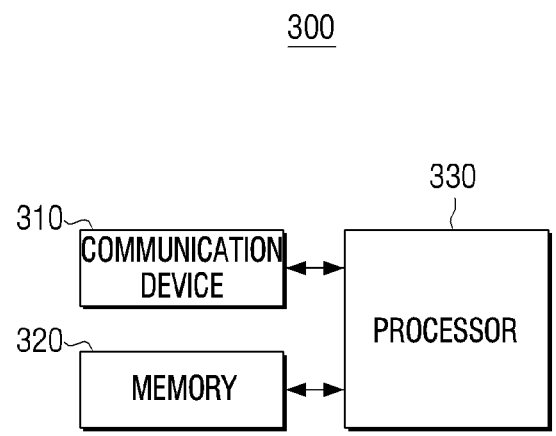
FIG. 5 is a block diagram illustrating a simple configuration of a server according to an embodiment of the disclosure.

FIG. 5 is a block diagram illustrating a simple configuration of a server according to an embodiment of the disclosure.

Referring to FIG. 5, the server 300 may include a communication device 310, a memory 320, and a processor 330.

The server 300 refers to a computer or a program that provides information or services to a client through a network.

The communication device 310 may be connected to an external device and may receive various data from the external device. Specifically, the communication device 310 may be connected to an external device through a local area network (LAN) and the Internet, as well as through a universal serial bus (USB) port or wireless communication (Wi-Fi 802.11a/b/g/n, NFC, Bluetooth) port. The external device may be a PC, a notebook, a smartphone, a server, or the like.

In addition, the communication device 310 may be connected to the first home appliance 100 or the second home appliance 200 in the voice recognition system 1000. For example, the communication device 310 may perform communication with the first home appliance 100 or the second home appliance 200 in the voice recognition system 1000 through Wi-Fi communication. Meanwhile, the method for the server 300 to communicate with the first home appliance 100 or the second home appliance 200 is not limited to the example described above.

The memory 320 stores various data for an overall operation of the server 300 such as a program for processing or controlling of the processor 330. Specifically, the memory 320 may store a plurality of application programs run in the server 300 and data and instructions for the operation of the server 300.

The memory 320 may be accessed by the processor 330, and data reading/writing/modifying/deleting/updating may be performed by the processor 330. The memory 320 may be implemented not only as a storage medium in the server 300, but also as an external storage medium, a removable disk including a USB memory, a web server through a network, and the like.

The memory 320 may store device information of a plurality of home appliances. Specifically, the memory 320 may store device information of a plurality of home appliances connected to the server 300 or a plurality of home appliances having a history of connection to the server. The device information of the home appliance may include serial number or universally unique identifier (UUID) information, and the information included is not limited to the example described above.

The memory 320 may store a noise path estimation filter required to generate noise data. Alternatively, the memory 320 may store an artificial intelligence model that generates a noise path estimation filter. Meanwhile, a specific operation of generating a noise path estimation filter using an artificial intelligence model will be described later with reference to FIG. 11.

The processor 330 controls the server 300. Specifically, the processor 330 may control each component of the server 300 according to a user's control command.

In addition, the processor 330 may perform preprocessing on the voice data obtained by the first home appliance 100 in place of the first home appliance 100. Specifically, the processor 330 may receive first voice data corresponding to sound in the vicinity the first home appliance 100 from the first home appliance 100. In addition, preprocessing may be performed on the received first voice data.

Meanwhile, when the second home appliance 200 is disposed in the vicinity of the first home appliance 100 and produces large magnitude noise, the processor 330 may perform preprocessing on the received first voice data using information on the noise produced in the second home appliance 200.

Hereinafter, a specific operation of performing preprocessing on the first voice data using information on noise produced in the second home appliance 200 will be described.

First, the processor 330 may receive information on the second home appliance 200 connected to the first home appliance 100 from the first home appliance 100. Specifically, the processor 330 may receive information on the second home appliance 200 which may be connected to the first home appliance 100 through short-range wireless communication or the second home appliance 200 connected to an access point (AP) to which the first home appliance 100 is connected, from the first home appliance 100.

The processor 330 may be connected to the second home appliance 200. Specifically, the processor 330 may be connected to the second home appliance 200 using the information of the second home appliance 200 received from the first home appliance 100.

The processor 330 may control the communication device 310 to request voice data from the first home appliance 100 and the second home appliance 200. Specifically, the processor 330 may control the communication device 310 to transmit a recording request signal for requesting generation and transmission of voice data to the first home appliance 100 and the second home appliance 200.

The recording request signal may include information on a predetermined time and information on a predetermined time length. The information included in the recording request signal is not limited to the example described above.

The processor 330 may receive voice data generated based on the request. Specifically, the processor 330 may receive first voice data obtained based on the recording request signal from the first home appliance 100. The processor 330 may receive second voice data obtained based on the recording request signal from the second home appliance 200.

The processor 330 may generate noise data which is sound data corresponding to pure noise of a noise source in the second home appliance 200 using the received second voice data.

In addition, the processor 330 may receive other types of reference data regarding the noise in addition to the second voice data generated by detecting the noise produced in the second home appliance 200.

For example, the processor 330 may receive reference data obtained through the accelerometer of the second home appliance 200 or reference data obtained through a control command input to the second home appliance 200. Here, the reference data may be generated based on noise source information including a magnitude and a phase of vibration produced from the noise source, a magnitude and a phase of noise produced from the noise source, and main frequency information.

The processor 330 may generate noise data which is sound data corresponding to pure noise of the noise source in the second home appliance 200 using the received reference data.

The processor 330 may use a noise path estimation filter to generate noise data. Meanwhile, a specific operation of generating noise data using the noise path estimation filter will be described later with reference to FIGS. 6 through 10.

The processor 330 may also be implemented to receive the noise data itself generated in the second home appliance 200, without receiving the second voice data or the reference data from the second home appliance 200.

The processor 330 may perform preprocessing on the first voice data using the noise data. Specifically, the processor 330 may perform preprocessing on the first voice data by removing a component corresponding to the noise of the noise source from the first voice data using the noise data generated through the noise path estimation filter.

In addition, the processor 330 may transmit the preprocessed first voice data to the first home appliance 100. In addition, the first home appliance 100 may perform voice recognition using the preprocessed first voice data received from the server 300.

In this manner, the server 300 receives the first voice data from the first home appliance which is to perform the voice recognition function, obtains the second voice data or reference data regarding the noise from the second home appliance that produces large magnitude noise, and performs preprocessing on the first voice data using the obtained second voice data or reference data, whereby the noise included in the voice data may be accurately removed even if the noise is large in magnitude.

Figure 6:
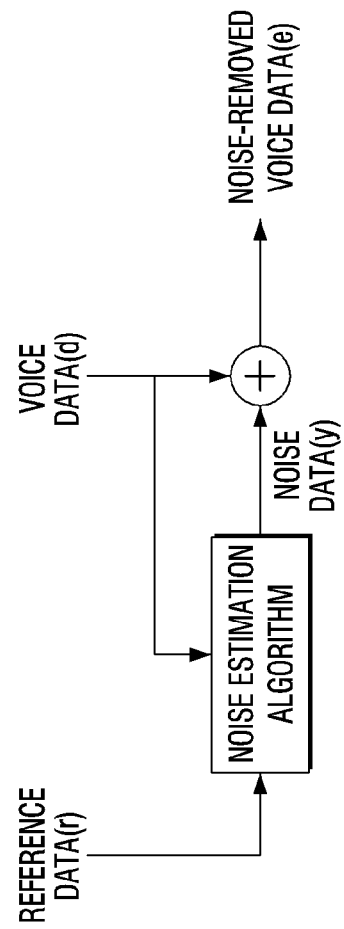
FIG. 6 is a diagram illustrating a noise removing method according to a first embodiment.
Figure 7:
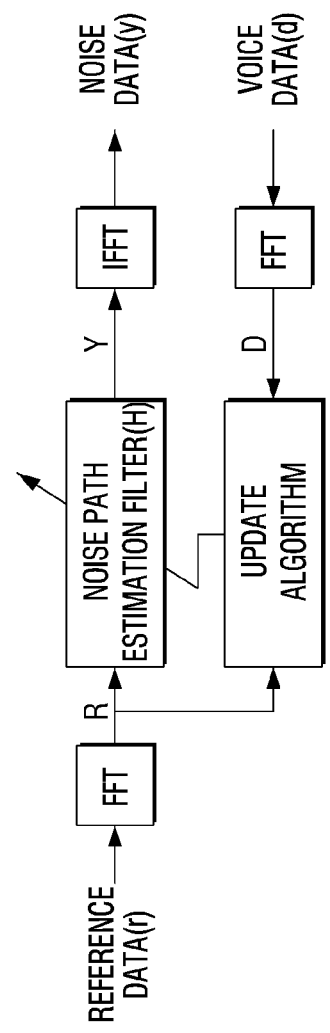
FIG. 7 is a diagram illustrating a noise removing method according to the first embodiment.

FIGS. 6 and 7 are diagrams illustrating a noise removing method according to a first embodiment.

FIG. 6 is a simple block diagram illustrating a noise removing method according to the first embodiment.

Referring to FIG. 6, noise data y is generated using reference data r, voice data d, and a noise estimation algorithm, and noise of voice data d is removed using the generated noise data y.

Here, the reference data r may be at least one of the second voice data obtained through the microphone 210 of the second home appliance 200, the acceleration information of the accelerometer 250 of the second home appliance 200, or reference data generated using a driving frequency checked from the control command.

The voice data d may correspond to the first voice data obtained by the microphone 110 of the first home appliance 100.

The processor 130 of the first home appliance 100 or the processor 330 of the server 300 may generate the noise data y using the noise estimation algorithm and the reference data r. Specifically, the processors 130 and 330 may extract the noise data y, which is sound data corresponding to a noise of the source noise, from the reference data r using the noise path estimation filter information included in the noise estimation algorithm.

The noise path estimation filter may be implemented as a finite impulse response (FIR) filter or an infinite impulse response (IIR) filter in a time domain. Alternatively, the noise path estimation filter may be implemented in the form of a transfer function predetermined for each frequency band in a frequency domain.

The noise path estimation filter may have a linear structure as in the example described above, but is not limited thereto and may have a non-linear structure.

The noise path estimation filter may be fixed and used as one noise path estimation filter, and in case that a plurality of noise path estimation filter information are stored in advance, one of the noise path estimation filters may be selected and used to generate the noise data y according to situations.

The processors 130 and 330 may perform preprocessing on the voice data d by removing a component corresponding to the noise of the noise source included in the voice data d using the generated noise data y.

The processor 330 of the server 300 may perform preprocessing and transmit noise-removed voice data e to the first home appliance 100. In addition, the processor 130 of the first home appliance 100 may perform voice recognition using the voice data e from which noise was removed by performing preprocessing.

Meanwhile, the processor 130 or 330 may update the method of generating the noise data y using the voice data d so that the accurate noise data y may be generated even when noise of the noise source is changed or a surrounding environment is changed.

Specifically, after performing preprocessing, the processors 130 and 330 may update the noise path estimation filter using the voice data d including the noise. Details thereof will be described below with reference to FIG. 7.

FIG. 7 is a block diagram illustrating a method of removing noise in a frequency domain according to the first embodiment.

Referring to FIG. 7, a noise estimation algorithm using a noise path estimation filter H in the frequency domain and performing updating using voice data d including noise may be identified.

The processors 130 and 330 may convert the reference data r into a frequency domain using fast Fourier transform (FFT). The processors 130 and 330 may obtain noise data Y (Y=R·H) converted into the frequency domain by applying the converted reference data R to the noise path estimation filter H. Also, the processors 130 and 330 may convert the noise data Y into the time domain using inverse fast Fourier transform (IFFT). The processors 130 and 330 may use the converted noise data y to remove noise of the voice data d.

Meanwhile, after performing the preprocessing, the processors 130 and 330 may update the noise path estimation filter H using the voice data d with noise mixed therein. Specifically, the processor 130 or 330 may update the noise path estimation filter H using a correlation between the voice data D converted into the frequency domain through the FFT from the voice data d including noise and the converted reference data R.

For example, it may be assumed that a k−1th noise path estimation filter is $H_{(k-1)}$, voice data including subsequent kth noise is $d_{(k)}$, kth reference data is $r_{(k)}$, voice data converted into kth frequency domain is $D_{(k)}$, and reference data converted into the kth frequency domain is $R_{(k)}$. In this case, a new noise path estimation filter $H_{(k)} = (H_{(k)} = G_{RR(k)} \cdot G_{DR(k)}^{(-1)})$ may be generated by multiplying an inverse matrix of $G_{RR(k)}$ which is an auto correlation value of the kth converted reference data $R_{(k)}$ and $G_{DR(k)}$ which is a cross correlation value of the kth reference data $R_{(k)}$ and the voice data $D_{(k)}$.

Here, $G_{RR(k)}$ is $G_{RR(k)} = (1-\lambda) \cdot G_{RR(k-1)} + \lambda \cdot R_{(k)} \cdot R_{(k)}^H$ ($R_{(k)}^H$ is a Hermitian matrix of reference data $(R_{(k)})$) and $G_{DR(k)} = (1-\lambda) \cdot G_{DR(k-1)} + \lambda \cdot D_{(k)} \cdot R_{(k)}^H$.

In addition, as the λ value, a constant determined according to systems may be used, or the λ value may be variably used for stability of the algorithm. For example, when used in a variable manner, the kth λ value may be $\lambda_{(k)} = \alpha \cdot (e^{f(k)}/(1+e^{f(k)}))$. Also, $f(k) = \beta \cdot \text{sqrt}(V(k)-M(k)^2)/|M(k)|$, $M(k) = (1-\gamma) \cdot M(k-1) + \gamma \cdot D_{(k)}$, $V(k) = (1-\gamma) \cdot V(k-1) + \gamma \cdot D_{(k)} \cdot \overline{D_{(k)}}$ (α, β, and γ are constants).

When the k+1th reference data $(r_{(k+1)})$ and voice data $(d_{(k+1)})$ are obtained, the processors 130 and 330 generate noise data $y_{(k+1)}$ from next reference data using an updated new noise path estimation filter $H_{(k)}$ and remove noise from the voice data $d_{(k+1)}$ using the generated noise data $y_{(k+1)}$.

Meanwhile, the method of updating the noise path estimation filter H is not limited to the example described above. For example, in the example described above, updating is performed each time the voice data including noise and the reference data are obtained, but it may be implemented such that updating is performed when voice data including a predetermined number of noise and reference data are obtained. In this case, updating may be performed using the voice data including the predetermined number of noise and the reference data together.

In FIGS. 6 and 7, it is illustrated and described that that the processors 130 and 330 update the noise path estimation filter after performing preprocessing on the voice data d including the noise but it may be implemented such that the noise path estimation filter may be updated first, and thereafter, preprocessing may be performed on the voice data d including noise.

Figure 8:
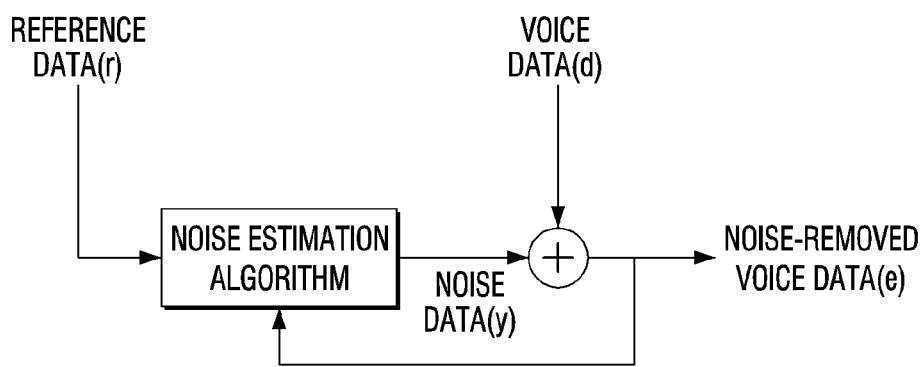
FIG. 8 is a diagram illustrating a noise removing method according to a second embodiment.
Figure 9:
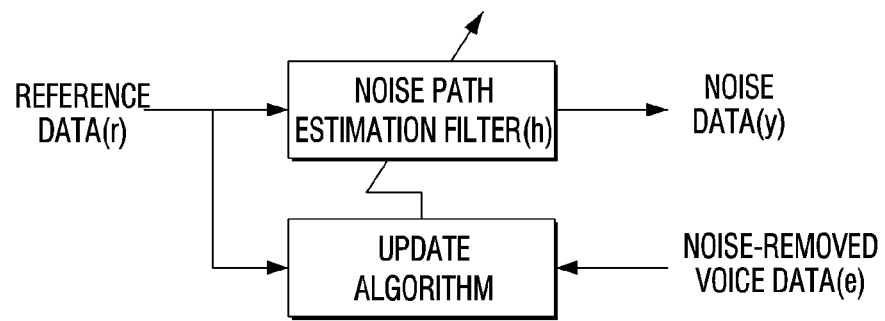
FIG. 9 is a diagram illustrating a noise removing method according to the second embodiment.
Figure 10:
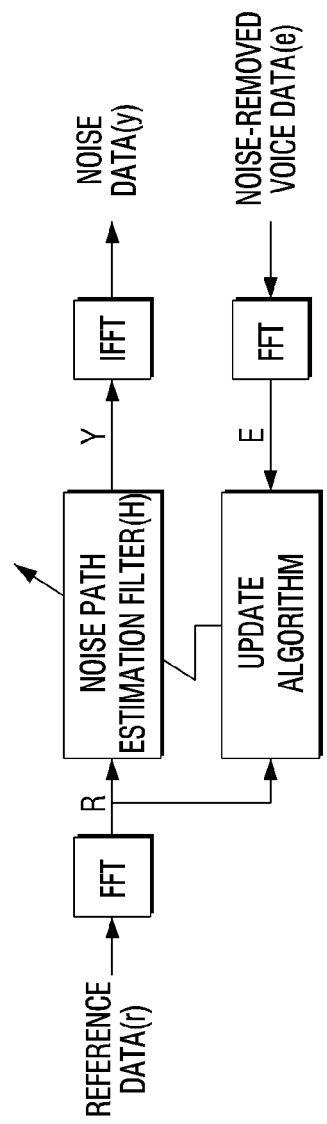
FIG. 10 is a diagram illustrating a noise removing method according to the second embodiment.

FIGS. 8 through 10 are diagrams illustrating a noise removing method according to a second embodiment.

FIG. 8 is a simple block diagram illustrating a noise removing method according to a second embodiment.

Referring to FIG. 8, it can be seen that noise data y is generated using the reference data r, the noise-removed voice data e, and the noise estimation algorithm, and noise of the voice data d is removed using the generated noise data y.

Here, the reference data r may be at least one of the second voice data obtained through the microphone 210 of the second home appliance 200 and the reference data generated using a driving frequency identified from the control command or the acceleration information of the accelerometer 250 of the second home appliance 200.

The voice data d may correspond to the first voice data obtained from the microphone 110 of the first home appliance 100.

The processors 130 and 330 may extract noise data y, which is sound data corresponding to noise of the noise source, from the reference data r using the noise path estimation filter information included in the noise estimation algorithm. Here, the configuration of the noise estimation filter is the same as that of FIG. 7, and thus, redundant description thereof will be omitted.

The processors 130 and 330 may perform preprocessing on the voice data d by removing a component corresponding to the noise of the noise source included in the voice data d using the generated noise data y.

The processor 330 of the server 300 may perform preprocessing to transmit the noise-removed voice data e to the first home appliance 100. In addition, the processor 130 of the first home appliance 100 may perform voice recognition using the noise-removed voice data e by performing preprocessing.

A difference between the second embodiment of FIG. 8 and the first embodiment of FIG. 6 lies in the method of updating the noise path estimation filter. Specifically, in the second embodiment, the processors 130 and 330 may update the method of generating noise data using the noise-removed voice data, rather than the voice data including the noise. Details thereof will be described below with reference to FIGS. 9 and 10.

FIG. 9 is a block diagram illustrating a method of removing noise in a time domain according to the second embodiment.

Referring to FIG. 9, a noise estimation algorithm using a noise path estimation filter, which is an FIR filter, in the time domain and performing updating using noise-removed voice data may be identified.

The processors 130 and 330 may obtain noise data y (y=h*r) by applying the reference data r to the noise path estimation filter h in the time domain. In addition, the processors 130 and 330 may obtain the noise-removed voice data e by removing the noise of the voice data d using the noise data y.

Meanwhile, the processors 130 and 330 may update the noise path estimation filter h using the noise-removed voice data e. Specifically, after performing preprocessing, the processors 130 and 330 may update the noise path estimation filter h using a correlation between the noise-removed voice data e and the reference data r.

For example, it may be assumed that a k−1th noise path estimation filter is $h_{(k-1)}$, kth noise-removed voice data is $e_{(k)}$, and kth reference data is $r_{(k)}$. In this case, the kth reference data $r_{(k)}$ may be stored to the buffer $r_{(k)}$ as much as a length of the noise path estimation filter $h_{(k-1)}$ and a new noise path estimation filter $h_{(k)}$ ($h_{(k)}=h_{(k-1)}+\mu \cdot e_{(k)} \cdot r_{(k)}$) may be generated using the buffer $r_{(k)}$ and the kth noise-removed voice data $e_{(k)}$.

Here, as μ, a constant determined according to systems may be used or μ may be variably used for stability of the algorithm. For example, when used in a variable manner, μ may be $\mu_{(k)}=\alpha/P(k)$. Also, $P(k)=(1-\gamma) \cdot P(k-1)+\gamma \cdot r(k)^T \cdot r(k)$) (α and γ are constants).

When the processors 130 and 330 obtain next reference data r' and voice data d', the processors 130 and 330 generate noise data y' from the next reference data using an updated new noise path estimation filter h' and remove noise of the voice data d' using the noise data y', thus obtaining noise-removed voice data e'.

Meanwhile, the method of updating the noise path estimation filter h in the time domain is not limited to the example described above. For example, in the example described above, updating is performed each time the noise-removed voice data and the reference data are obtained, but it may also be implemented such that updating is performed when the voice data from which a predetermined number of noise was removed and reference data are obtained. In this case, updating may be performed using the voice data from which the predetermined number of noise was removed and the reference data together.

Meanwhile, the noise path estimation filter h may be a filter implemented in the form of a predetermined transfer function for each frequency band in the frequency domain, rather than an FIR filter in the time domain, and the noise path estimation filter h may be updated using the noise-removed voice signal e. Details thereof will be described later with reference to FIG. 10.

FIG. 10 is a block diagram illustrating a method of removing noise in a frequency domain according to the second embodiment.

Referring to FIG. 10, a noise estimation algorithm using a noise path estimation filter in a frequency domain and performing updating using noise-removed voice data may be identified.

The processors 130 and 330 may convert the reference data r into a frequency domain using the FFT. The processors 130 and 330 may obtain noise data Y (Y=R·H) converted into the frequency domain by applying the converted reference data R to the noise path estimation filter H. Also, the processors 130 and 330 may convert the noise data Y into a time domain using IFFT. The processor 130 may use the converted noise data y to remove noise of the voice data d.

Meanwhile, the processors 130 and 330 may update the noise path estimation filter H in the frequency domain using the noise-removed voice data e. Specifically, the processors 130 and 330 may update the noise path estimation filter H using a correlation between the voice data E converted into the frequency domain through the FFT from the voice data e and the converted reference data R.

For example, it may be assumed that k−1th noise path estimation filter is $H_{(k-1)}$, kth converted noise-removed voice data is $E_{(k)}$, and kth reference data converted into the frequency domain is $R_{(k)}$. Here, a new noise path estimation filter $H_{(k)}$ ($H_{(k)} = H_{(k+1)} + \mu \cdot R_{(k)}{}^H \cdot E_{(k)}$) may be generated by adding a component obtained by multiplying a Hermitian matrix of the kth reference data $R_{(k)}$ converted into the frequency domain and the kth noise-removed voice data $E_{(k)}$ to the k−1th noise path estimation filter $H_{(k-1)}$.

Here, as μ, a constant determined according to systems may be used or μ may be variably used for stability of the algorithm. For example, in the case of using μ in a variable manner, the kth μ may be $\mu(k) = \alpha \cdot (e^{f(k)}/(1+e^{f(k)}))$. Also, it may be implemented that $f(k) = \beta \cdot sqrt(V(k) - |M(k)|^2)/|M(k)|$, $M(k) = (1-\gamma) \cdot M(k-1) + \gamma \cdot D_{(k)}$, $V(k) = (1-\gamma) \cdot V(k-1) + \gamma \cdot D_{(k)} \cdot \overline{D_{(k)}}$ (α, β, and γ are constants).

When next reference data $r_{(k+1)}$ and the voice data $d_{(k+1)}$ are obtained, the processors 130 and 330 may generate noise data $y_{(k+1)}$ from the next reference data using the updated new noise path estimation filter $H_{(k)}$ and noise may be removed from the voice data $d_{(k+1)}$ using the generated noise data $y_{(k+1)}$.

Meanwhile, the method of updating the noise path estimation filter H is not limited to the example described above. For example, in the example described above, updating is performed each time the noise-removed voice data and the reference data are obtained, but updating may also be performed when a predetermined number of noise-removed voice data and reference data are obtained. In this case, updating may be performed using the predetermined number of noise-removed voice data and the reference data together.

Also, in FIGS. 8 through 10, it is illustrated and described that the processors 130 and 330 update the noise path estimation filter after performing preprocessing on the voice data d including noise, but it may also be implemented such that the noise path estimation filter is first updated and preprocessing is performed on the voice data d including noise.

Figure 11:
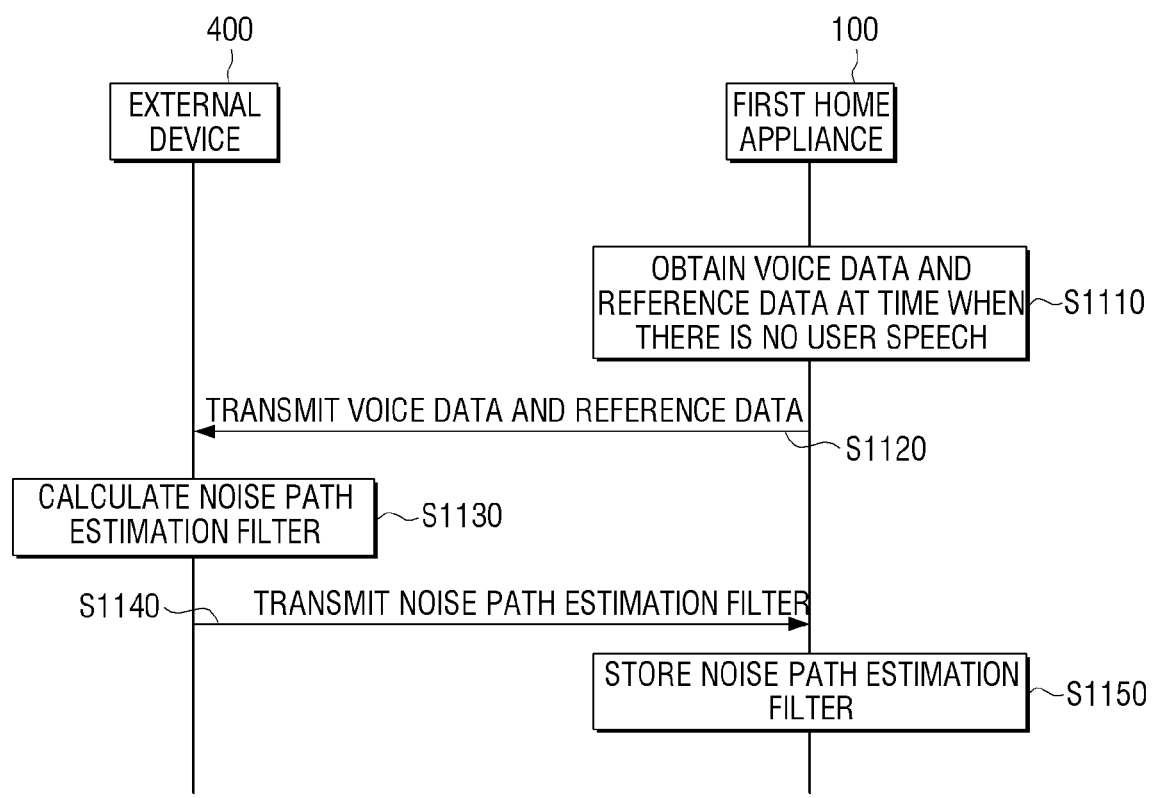
FIG. 11 is a diagram illustrating a noise removing method according to a third embodiment.
Figure 12:
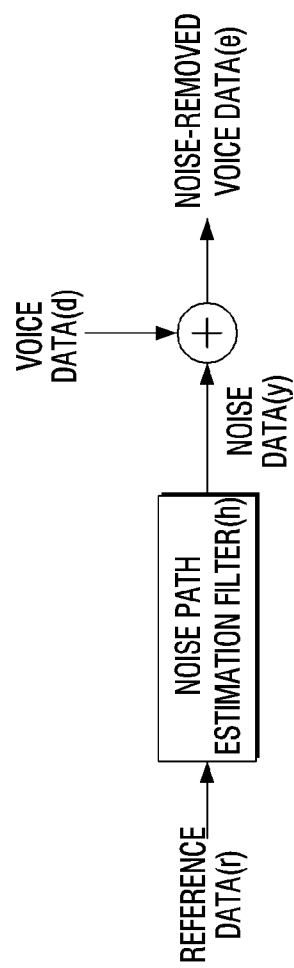
FIG. 12 is a diagram illustrating a noise removing method according to the third embodiment.
Figure 13:
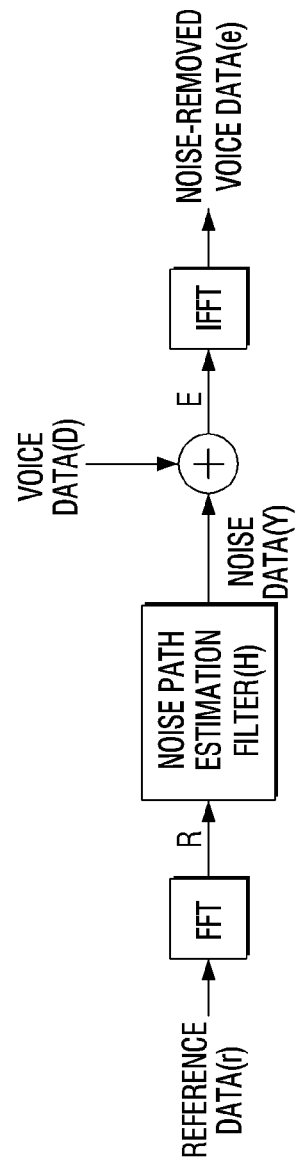
FIG. 13 is a diagram illustrating a noise removing method according to the third embodiment.

FIGS. 11 through 13 are diagrams illustrating a noise removing method according to a third embodiment.

The information on the noise path estimation filter may be previously stored in the first home appliance 100 or the server 300 and used to generate noise data as described above. However, the noise path estimation filter may not be pre-stored in the manufacturing stage of the first home appliance 100 but may be generated through an artificial intelligence model after the first home appliance 100 is installed in a home. Alternatively, the server 300 may generate a noise path estimation filter suitable for a home appliance connected through an artificial intelligence model.

In addition, the first home appliance 100 or the server 300 may perform noise removal using the generated noise path estimation filter.

In the following description, it is assumed that the first home appliance 100 obtains a noise path estimation filter from an external device 400 including an artificial intelligence model.

FIG. 11 is a sequence diagram illustrating a method of obtaining a noise path estimation filter by the first home appliance 100.

Referring to FIG. 11, first, the first home appliance 100 may obtain voice data and reference data at a time when there is no user's speech (S1110). Specifically, in order to generate a noise path estimation filter, voice data and reference data in which there is no user's spoken voice and only noise of a noise source are detected are required. Therefore, when voice data determined not to have a user's speech is determined as a result of performing voice recognition, reference data obtained at the same time point as that of corresponding voice data may be checked.

In operation S1120, the first home appliance 100 may transmit the obtained voice data and reference data to the external device 400. Specifically, the first home appliance 100 may transmit the obtained voice data and reference data as a signal in a time domain or convert it into a frequency domain and transmit the same to the external device 400.

Meanwhile, when the first home appliance 100 has only voice data at the time when there is no user's speech, the external device 400 or the first home appliance 100 may request reference data at the corresponding time from the second home appliance 200 and obtain the reference data.

In addition, the noise of the noise source of the second home appliance 200 may be different according to a change in an operation mode of the second home appliance 200 or an environment. Therefore, it is needed to generate a noise path estimation filter to be applied to each case. To this end, the first home appliance 100 may transmit information on an operation mode of the second home appliance 200 or information on a surrounding environment together, when transmitting information to the external device 400.

For example, when the second home appliance 200 is a washing machine, a rotation speed of the motor included in the washing machine may vary according to an operation mode. Therefore, a magnitude or characteristics of noise of the noise source (motor) may vary according to the operation mode.

Therefore, the information on each operation mode of the second home appliance 200 and the voice data and the reference data obtained when the second home appliance 200 operates in each operation mode may be transmitted together, so that the external device 400 may generate a noise path estimation filter applicable to each operation mode.

The external device 400 may calculate a noise path estimation filter using the received voice data and reference data (S1130). Specifically, the external device 400 may obtain a noise path estimation filter using an artificial intelligence model that receives voice data and reference data and outputs a noise path estimation filter corresponding thereto. The artificial intelligence model may be a linear regression model.

The external device 400 may transmit the calculated noise path estimation filter information to the first home appliance 100 (S1140). Meanwhile, when the second home appliance 200 is implemented in such a manner as to obtain second voice data and generate noise data using the obtained second voice data, the noise path estimation filter may be transmitted to the second home appliance 200.

The first home appliance 100 may store information of the received noise path estimation filter (S1150).

In addition, the first home appliance 100 may generate noise data using the obtained reference data and noise path estimation filter information, and remove noise of the voice data including user's spoken voice using the generated noise data. The first home appliance 100 may perform the voice recognition function using the noise-removed voice data.

Meanwhile, in FIG. 11, it is illustrated and described that the external device is a device other than the voice recognition system but it may be implemented as a server in the voice recognition system.

In addition, in FIG. 11, it is illustrated and described that the voice data and the reference data are transmitted to the external device and the noise path estimation filter generated by an artificial intelligence mode is received from the external device, but the first home appliance may generate a noise path estimation filter using the previously stored artificial intelligence model when implemented.

Alternatively, a separate device in the home appliance distinguished from the processor may generate a noise path estimation filter using the pre-stored artificial intelligence model, and the processor may use the generated noise path estimation filter. Meanwhile, the method of generating the noise path estimation filter is not limited to the example described above.

Hereinafter, a specific operation of removing noise using a noise path estimation filter generated using an artificial intelligence model will be described.

FIG. 12 is a block diagram illustrating a method of removing noise in a time domain according to the third embodiment.

Referring to FIG. 12, a noise removing method using a noise path estimation filter h in a time domain may be identified.

The processor 130 of the first home appliance 100 may remove noise using the noise path estimation filter h received from the external device 400. Alternatively, when the server 300 generates the noise path estimation filter using the artificial intelligence model, the processor 330 of the server 300 may perform noise removal using the generated noise path estimation filter h.

Specifically, the processors 130 and 330 may obtain noise data y (y=h*r) by applying the reference data r to the noise path estimation filter h. In addition, the processors 130 and 330 may obtain the noise-removed voice data e by removing the noise of the voice data d using the noise data y.

FIG. 13 is a block diagram illustrating a method of removing noise in a frequency domain according to the third embodiment.

Referring to FIG. 13, a noise removing method using a noise path estimation filter H in a frequency domain may be identified.

The processors 130 and 330 may convert the reference data r into a frequency domain using FFT. The processors 130 and 330 may obtain noise data Y (Y=R·H) converted into the frequency domain by applying the converted reference data R into the noise path estimation filter H.

In addition, the processors 130 and 330 may remove noise of the converted voice data D through the FFT using the noise data Y. In addition, the processors 130 and 330 may obtain the noise-removed voice data e by converting the noise-removed voice data E into a time domain using IFFT.

In FIGS. 12 and 13, it is illustrated and described that updating is not performed on the noise path estimation filter, but updating may be performed on the noise path estimation filter according to the updating method described above when implemented.

Figure 14:
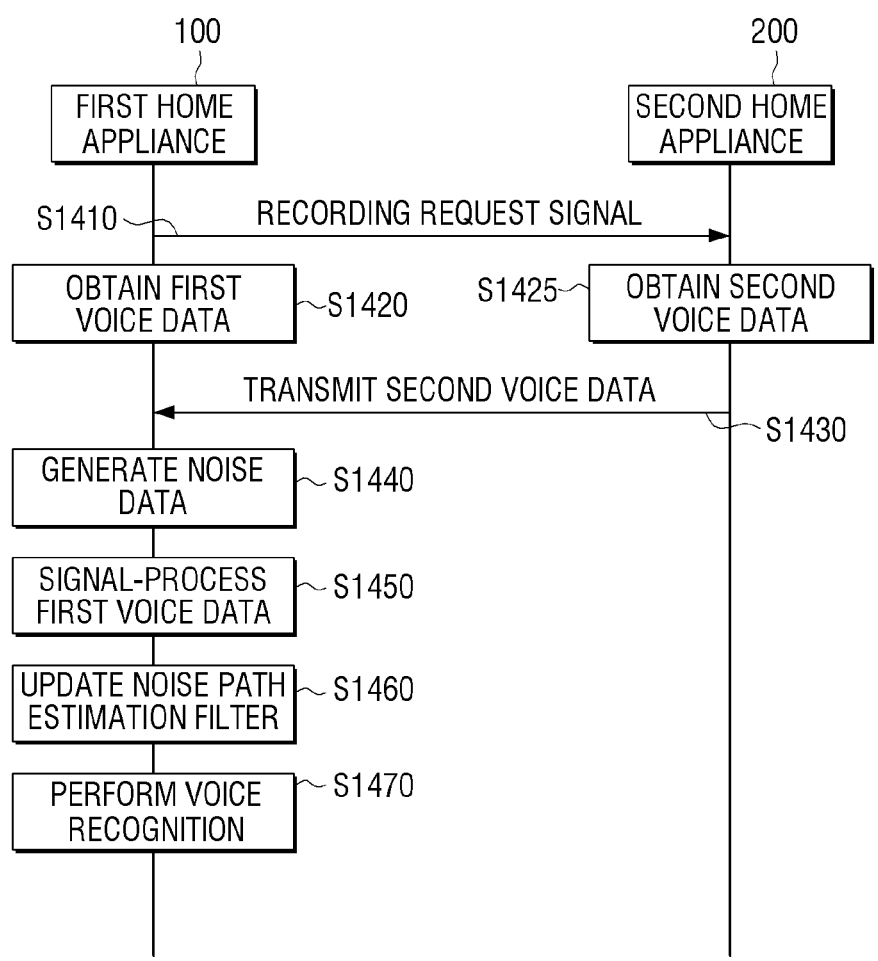
FIG. 14 is a sequence diagram illustrating a voice recognition method according to the first embodiment.
Figure 15:
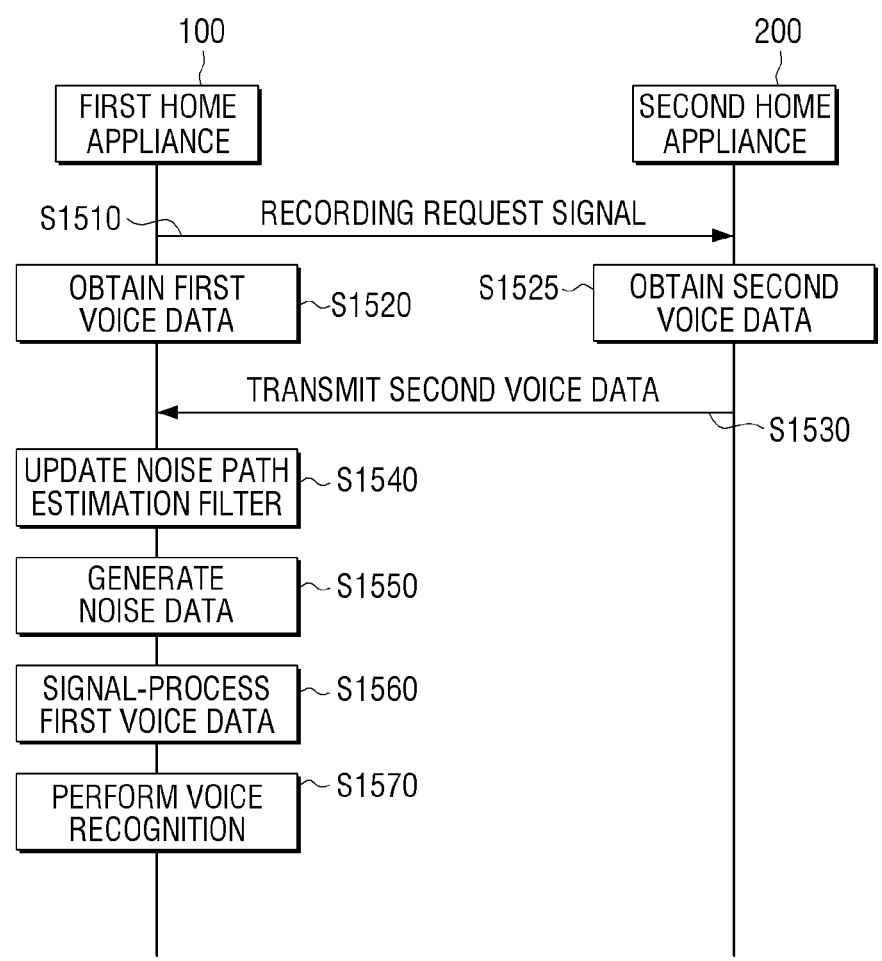
FIG. 15 is a sequence diagram illustrating a voice recognition method according to the first embodiment.
Figure 16:
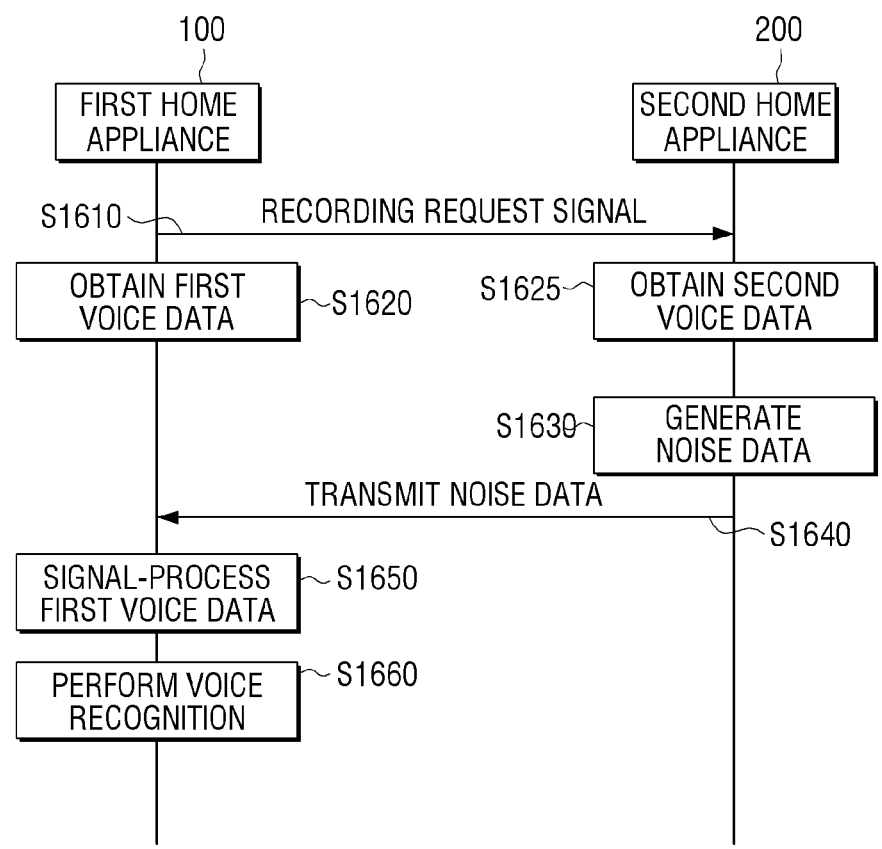
FIG. 16 is a sequence diagram illustrating a voice recognition method according to the first embodiment.

FIGS. 14 through 16 are sequence diagrams illustrating a voice recognition method performed without intervention of a server.

FIG. 14 is a sequence diagram illustrating a voice recognition method performed without intervention of a server according to the first embodiment of the disclosure.

Referring to FIG. 14, first, the first home appliance 100 may transmit a recording request signal to the second home appliance 200 (S1410). In this case, the recording request signal may include information on a predetermined time and information on a predetermined time length.

The first home appliance 100 may obtain first voice data corresponding to the recording request signal (S1420). Specifically, the first home appliance 100 may obtain first voice data based on predetermined time information and predetermined time length information included in the recording request signal.

The second home appliance 200 may obtain second voice data corresponding to the recording request signal (S1425). Specifically, the second home appliance 200 may obtain second voice data based on the predetermined time information and the predetermined time length information included in the recording request signal.

The second home appliance 200 may transmit the obtained second voice data to the first home appliance 100 (S1430).

The first home appliance 100 may generate noise data using the received second voice data (S1440). Specifically, the first home appliance 100 may generate noise data which is sound data corresponding to pure noise of a noise source in the second home appliance 200 by applying the received second voice data to the noise path estimation filter.

The first home appliance 100 may perform preprocessing on the first voice data using the noise data (S1450).

The first home appliance 100 may update the noise path estimation filter (S1460). Specifically, the first home appliance 100 may update the noise path estimation filter using the second voice data and the first voice data or may update the noise path estimation filter using the second voice data and the preprocessed first voice data. Meanwhile, the method of updating the noise path estimation filter has been described above, and thus, a redundant description thereof will be omitted.

The first home appliance 100 may perform voice recognition using the preprocessed first voice data (S1470).

FIG. 15 is a sequence diagram illustrating a voice recognition method performed without intervention of a server according to the second embodiment of the disclosure.

Referring to FIG. 15, first, the first home appliance 100 may transmit a recording request signal to the second home appliance 200 (S1510).

The first home appliance 100 may obtain first voice data corresponding to the recording request signal (S1520).

The second home appliance 200 may obtain second voice data corresponding to the recording request signal (S1525).

The second home appliance 200 may transmit the obtained second voice data to the first home appliance 100 (S1530).

The first home appliance 100 may update the noise path estimation filter before performing the preprocessing on the first voice data (S1540).

For example, as illustrated in FIG. 7, when the noise path estimation filter is determined by $G_{RR}$, which is an auto correlation value of reference data, and $G_{DR}$, which is a cross correlation value of reference data and voice data ($H_{(k)} = G_{RR(k)} \cdot G_{DR(k)}^{(-1)}$), the noise path estimation filter may be updated by updating $G_{RR}$ and $G_{DR}$.

As another example, as shown in FIG. 9, when the noise path estimation filter is determined by the buffer of the reference data r and the noise-removed voice data ($h_{(k)} = h_{(k-1)} + \mu_{(k)} \cdot e_{(k)} \cdot r_{(k)}$, $e_{(k)} = h_{(k-1)} * d_{(k)}$, $\mu_{(k)} = \alpha/P(k)$, $P(k) = (1-\gamma) \cdot P(k-1) + \gamma \cdot r(k)^T \cdot r(k)$), the noise path estimation filter may be updated by updating the reference data r of the buffer and $P(k)$.

In another example, when the noise path estimation filter is determined by the Hermitian matrix of reference data and the noise-removed voice data ($H_{(k)} = H_{(k-1)} + \mu \cdot R_{(k)}^H \cdot E_{(k)}$, $E_{(k)} = D_{(k)} - R_{(k)} \cdot H_{(k-1)}$) as shown in FIG. 10, the noise path estimation filter may be updated by updating the Hermitian matrix of the reference data.

The first home appliance 100 may generate noise data using the received second voice data (S1550). Specifically, the first home appliance 100 may generate noise data which is sound data corresponding to pure noise of a noise source in the second home appliance 200 by applying the received second voice data to the updated noise path estimation filter.

The first home appliance 100 may perform preprocessing on the first voice data using the noise data (S1560).

The first home appliance 100 may perform voice recognition using the preprocessed first voice data (S1570).

FIG. 16 is a sequence diagram illustrating a voice recognition method performed without intervention of a server according to a third embodiment of the disclosure.

Referring to FIG. 16, first, the first home appliance 100 may transmit a recording request signal to the second home appliance 200 (S1610).

In operation S1620, the first home appliance 100 may obtain first voice data corresponding to the recording request signal. Specifically, the first home appliance 100 may obtain first voice data based on predetermined time information and predetermined time length information included in the recording request signal.

The second home appliance 200 may obtain second voice data corresponding to the recording request signal (S1625).

The second home appliance 200 may generate noise data using the second voice data (S1630). Specifically, the second home appliance 200 may generate noise data which is sound data corresponding to pure noise of the noise source in the second home appliance 200 by applying the second voice data to the noise path estimation filter. The noise path estimation filter may be a filter previously stored in the second home appliance 200 or generated by an artificial intelligence model of the server 300 or the external device 400 and transmitted to the second home appliance 200.

The second home appliance 200 may transmit the generated noise data to the first home appliance 100 (S1640).

The first home appliance 100 may perform preprocessing on the first voice data using the received noise data (S1650).

The first home appliance 100 may perform voice recognition using the preprocessed first voice data (S1660).

As described above, the first home appliance 100 may estimate noise using information on the noise produced in the other home appliance without intervention of the server in various manners, and reduce the estimated noise.

Figure 17:
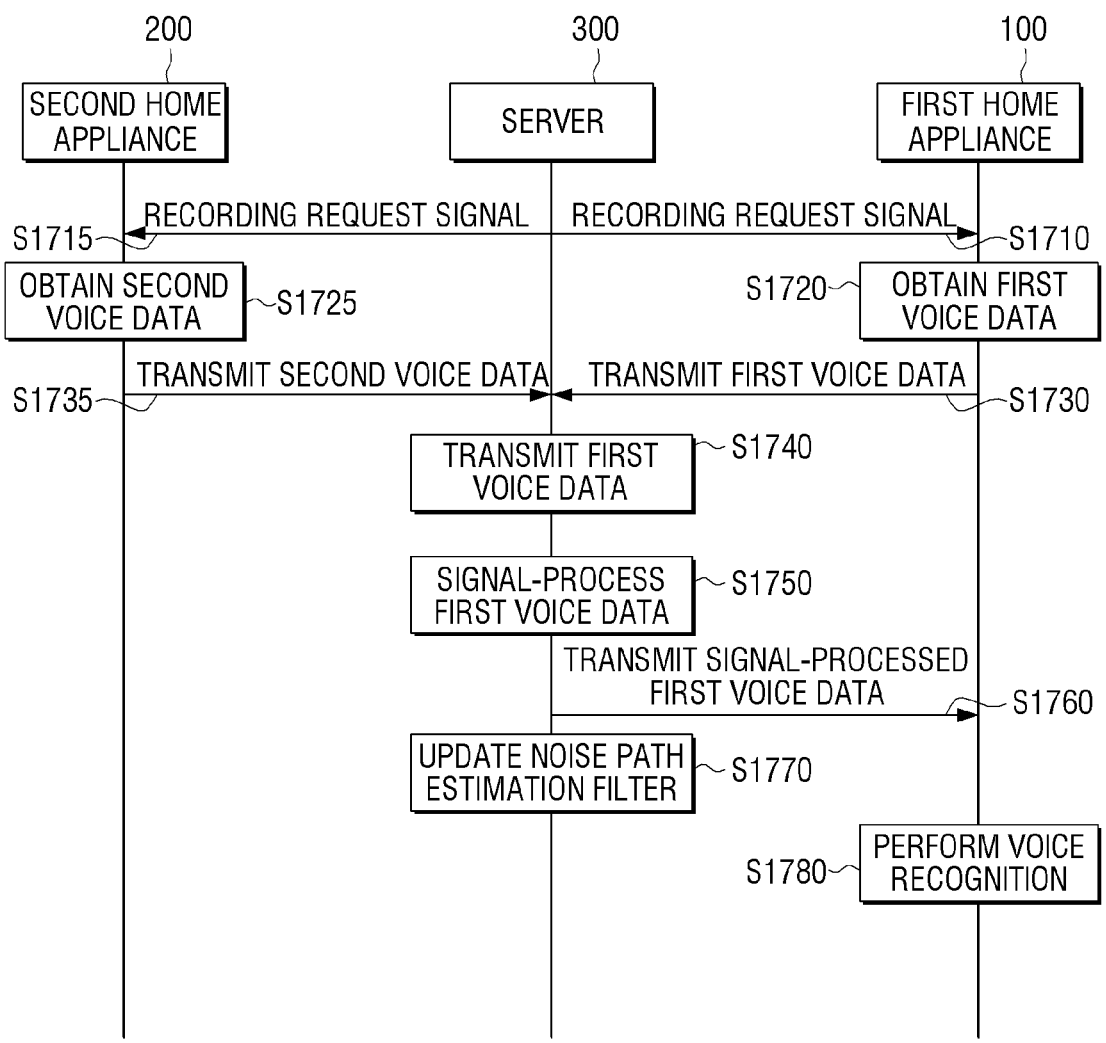
FIG. 17 is a flowchart illustrating a voice recognition method according to the second embodiment.
Figure 18:
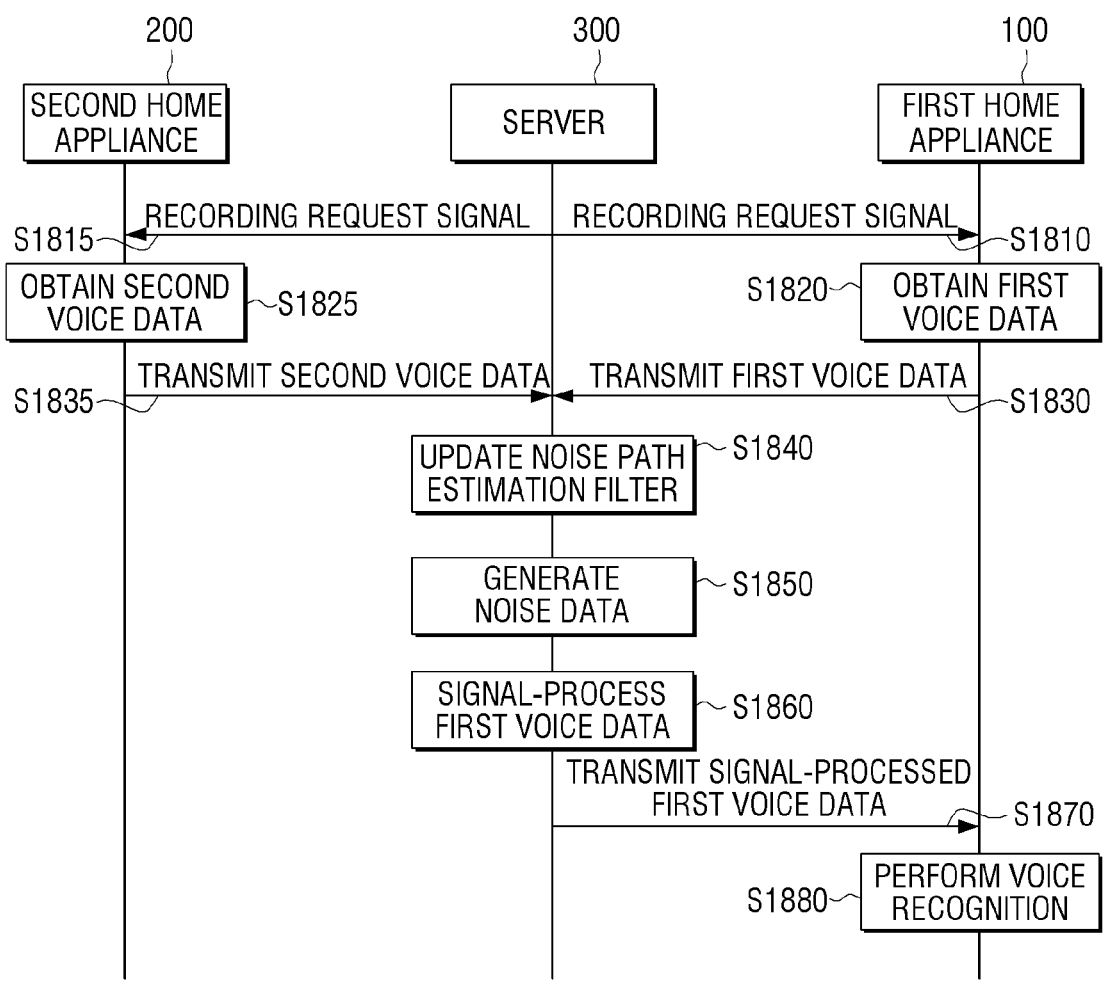
FIG. 18 is a flowchart illustrating a voice recognition method according to the second embodiment.

FIGS. 17 and 18 are sequence diagrams illustrating a voice recognition method performed according to intervention of a server.

FIG. 17 is a sequence diagram illustrating a voice recognition method performed according to intervention of a server according to the first embodiment of the disclosure.

Referring to FIG. 17, first, the server 300 may transmit a recording request signal to the first home appliance 100 (S1710). The server 300 may transmit a recording request signal to the second home appliance 200 (S1715). In this case, the recording request signal may include information on a predetermined time and information on a predetermined time length.

The first home appliance 100 may obtain first voice data corresponding to the recording request signal (S1720). Specifically, the first home appliance 100 may obtain first voice data based on the predetermined time information and the predetermined time length information included in the recording request signal.

The second home appliance 200 may obtain second voice data corresponding to the recording request signal (S1725). Specifically, the second home appliance 200 may obtain second voice data based on the predetermined time information and the predetermined time length information included in the recording request signal.

The first home appliance 100 may transmit the obtained first voice data to the server 300 (S1730). The second home appliance 200 may transmit the obtained second voice data to the server 300 (S1735).

The server 300 may generate noise data using the received second voice data (S1740). Specifically, the server 300 may generate noise data which is sound data corresponding to pure noise of the noise source in the second home appliance 200 by applying the received second voice data to the noise path estimation filter.

The server 300 may perform preprocessing on the first voice data using the noise data (S1750). The server 300 may transmit the preprocessed first voice data to the first home appliance 100 (S1760).

The server 300 may update the noise path estimation filter (S1770). Specifically, the server 300 may update the noise path estimation filter using the second voice data and the first voice data or update the noise path estimation filter using the second voice data and the preprocessed first voice data. Meanwhile, the method of updating the noise path estimation filter has been described above, and thus, a redundant description thereof will be omitted.

The first home appliance 100 may perform voice recognition using the preprocessed first voice data (S1780).

FIG. 18 is a sequence diagram illustrating a voice recognition method performed under intervention of a server according to the second embodiment of the disclosure.

Referring to FIG. 18, first, the server 300 may transmit a recording request signal to the first home appliance 100 (S1810). The server 300 may transmit a recording request signal to the second home appliance 200 (S1815).

The first home appliance 100 may obtain first voice data corresponding to the recording request signal (S1820). The second home appliance 200 may obtain second voice data based on the recording request signal (S1825).

The first home appliance 100 may transmit the obtained first voice data to the server 300 (S1830). The second home appliance 200 may transmit the obtained second voice data to the server 300 (S1835).

The server 300 may update the noise path estimation filter before performing the preprocessing on the first voice data (S1840). The operation of updating the noise path estimation filter before performing the preprocessing has been described above with reference to FIG. 15, and thus, a redundant description thereof will be omitted.

The server 300 may generate noise data using the received second voice data (S1850). Specifically, the server 300 may generate noise data corresponding to pure noise of the noise source in the second home appliance 200 by applying the received second voice data to the updated noise path estimation filter.

The server 300 may perform preprocessing on the first voice data using the noise data (S1860). The server 300 may transmit the preprocessed first voice data to the first home appliance 100 (S1870).

The first home appliance 100 may perform voice recognition using the preprocessed first voice data (S1880).

As described above, the server may estimate the noise using the information on the noise produced in the second home appliance in various manners and reduce the estimated noise from the voice data of the first home appliance.

In FIGS. 17 and 18, it is illustrated and described that the server 300 is connected to two home appliances but the server may be connected to two or more home appliances and estimate noise using information on the noise produced in the two or more home appliances when implemented.

Figure 19:
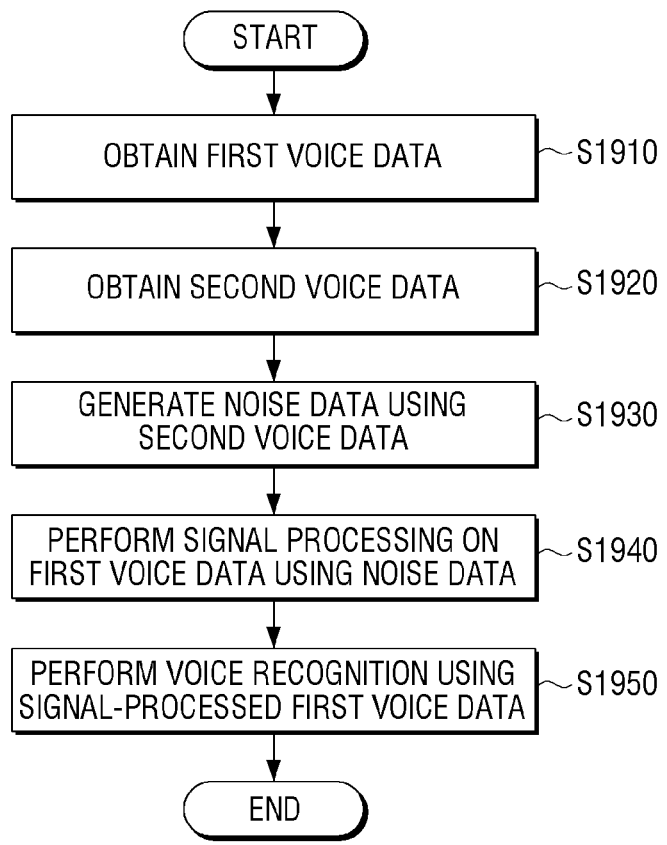
FIG. 19 is a flowchart illustrating a voice recognition method of a first home appliance according to an embodiment of the disclosure.

FIG. 19 is a flowchart illustrating a voice recognition method of a first home appliance according to an embodiment of the disclosure.

Referring to FIG. 19, first, first voice data is obtained through a microphone of a first home appliance (S1910).

In addition, other home appliances that may be connected to the first home appliance may be detected. Specifically, a second home appliance which may be connected to the first home appliance through short-range wireless communication or a second home appliance connected to an access point AP to which the first home appliance is connected may be detected.

The first home appliance may request transmission of voice data from the second home appliance. Specifically, a recording request signal for requesting generation and transmission of second voice data, which is voice data regarding noise produced in the second home appliance, may be transmitted to the second home appliance.

Here, the recording request signal may include information on a predetermined time or information on a predetermined time length. Meanwhile, the information that may be included in the recording request signal is not limited to the example described above.

Second voice data is received from the second home appliance (S1920). Specifically, the second voice data generated based on the predetermined time information and the predetermined time length information included in the recording request signal may be received from the second home appliance.

First voice data may be obtained based on the request transmitted to the second home appliance. Specifically, first voice data may be obtained through a microphone of the first home appliance based on the predetermined time information and the predetermined time length information included in the recording request signal transmitted to the second home appliance.

Noise data is generated using the received second voice data (S1930). Here, the noise data refers to sound data corresponding to noise of the noise source.

The noise data may be obtained by extracting only a component corresponding to the noise of the noise source from the second voice data or filtering remaining components other than the component corresponding to the noise of the noise source.

The noise data may be generated by filtering the remaining components other than the component corresponding to the noise source included in the second voice data using at least one of a finite impulse response (FIR) filter or an infinite impulse response (IIR) filter in the time domain.

Alternatively, the noise data may extract a component corresponding to the noise of the noise source from the second voice data using a transfer function previously determined for each frequency band on the frequency domain.

The information on the above-described filter or transfer function may be pre-stored in a home appliance at a manufacturing stage and used to generate noise data, but is not limited thereto.

For example, when communication with an external device is possible, information on a filter or a transfer function may be received through communication with the external device, and noise data may be generated using the information on the received filter or transfer function.

In this case, the information on the filter or the transfer function received from the external device may be information obtained using an artificial intelligence model included in the external device.

Signal processing is performed on the first voice data using the generated noise data (S1940). Specifically, signal processing for removing a component corresponding to noise of a noise source included in the first voice data may be performed using the noise data.

Meanwhile, the noise source of the second home appliance may be a motor disposed in a housing of the second home appliance to perform a predetermined function of the second home appliance. In this case, the second voice data may be voice data obtained from a microphone of the second home appliance. The noise data may be motor noise data of the motor of the second home appliance, and preprocessing on the first voice data may be performed by removing the motor noise from the first voice data.

A signal processing method for the first voice data may be changed according to whether noise is produced in the second home appliance.

For example, it is assumed that a sound produced in the second home appliance is produced by the motor included in the second home appliance. In this case, the preprocessing method regarding the first voice data may be changed depending on whether the motor of the second home appliance is driven.

Specifically, it may be determined whether the motor of the second home appliance is driven. If the motor of the second home appliance is driven, noise produced in the second home appliance is large in magnitude, and thus preprocessing on the first voice data may be performed using the second voice data according to the method described above.

Meanwhile, when the motor of the second home appliance is not driven, there is no noise produced in the second home appliance itself, and thus, voice recognition may be performed directly using the first voice data without using the second voice data or preprocessing may be performed on the first voice data according to the related art method.

Meanwhile, even when the noise source of the second home appliance is a fan or the like, rather than the motor, the method of preprocessing on the first voice data may be changed according to whether the noise source is driven.

Voice recognition is performed using the signal-processed first voice data (S1950).

In addition, the method of generating noise data may be updated using at least one of the first voice data including noise, the signal-processed first voice data, or the second voice data to generate accurate noise data even when noise of the noise source is changed or a surrounding environment is changed.

Specifically, the method of generating noise data may be updated using a correlation between at least one of the first voice data and the signal-processed first voice data and the second voice data.

Meanwhile, the operation of updating the method of generating noise data may be performed after signal processing is performed on the first voice data as described above, but alternatively, the operation of updating the method of generating noise data may be first performed before signal processing is performed on the first voice data.

Accordingly, in the voice recognition method of the home appliance of the disclosure, the voice data of the noise is obtained from another home appliance which produces large magnitude noise and the preprocessing is performed on the obtained noise using the voice data, whereby the noise included in the voice data obtained through the microphone may be accurately removed even though a magnitude of the noise produced from outside is large. The voice recognition method as shown in FIG. 19 may also be executed on a home appliance having the configuration of FIG. 2 or 3 or may be executed on a home appliance having another configuration.

In addition, the voice recognition method as described above may be implemented by at least one executable program for executing the voice recognition method as described above, and such an executable program may be stored in a non-transitory readable medium.

The non-transitory readable medium refers to a medium which stores data semi-permanently and is readable by a device, not a medium storing data for a short time such as a register, a cache, a memory, and the like. Specifically, various applications or programs may be stored and provided in a non-transitory readable medium such as a CD, a DVD, a hard disk, a Blu-ray disk, a USB, a memory card, a ROM, or the like.

Figure 20:
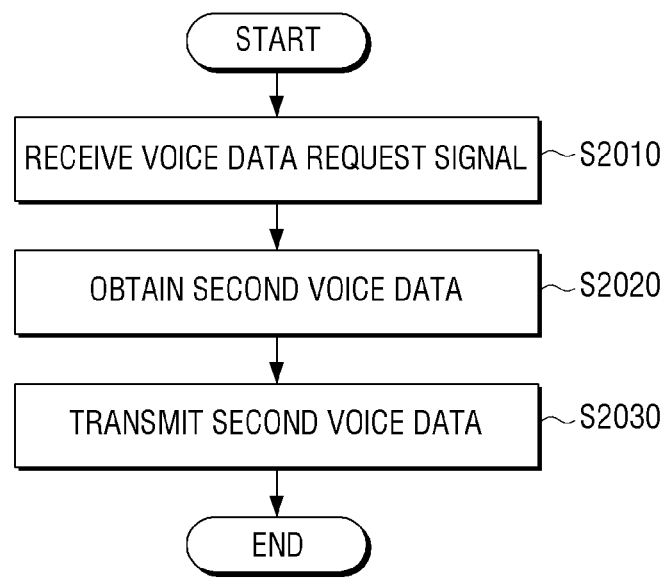
FIG. 20 is a flowchart illustrating a voice recognition method of a second home appliance according to an embodiment of the disclosure.

FIG. 20 is a flowchart illustrating a voice recognition method of a second home appliance according to an embodiment of the disclosure.

Referring to FIG. 20, first, a voice data request signal may be received (S2010). Specifically, a recording request signal requesting generation and transmission of second voice data which is voice data of the noise produced in the second home appliance may be received from a server or a first home appliance connected to the second home appliance.

Second voice data may be obtained through a microphone of the second home appliance (S2020). Specifically, noise may be detected using the microphone of the second home appliance and the second voice data may be obtained based on the received recording request signal. More specifically, the second voice data may be obtained based on information on a predetermined time and predetermined time length information included in the received recording request signal.

The obtained second voice data may be transmitted (S2030). Specifically, the obtained second voice data may be transmitted to the server or the first home appliance connected to the second home appliance.

Meanwhile, the second voice data may not be transmitted to the server or the first home appliance connected to the second home appliance, and noise data may be generated using the second voice data and the generated noise data may be transmitted to the first home appliance or the server.

Thus, in the voice recognition method of the home appliance according to the disclosure, because the reference data regarding the noise of the internal noise source is generated and provided to the home appliance or server which is to perform voice recognition function, the home appliance or the server may accurately remove the noise included in the voice data including user's speech. The voice recognition method as shown in FIG. 20 may be executed on a home appliance having the configuration of FIG. 4 or may be executed on a home appliance having another configuration.

In addition, the voice recognition method as described above may be implemented by at least one executable program for executing the voice recognition method as described above, and such an executable program may be stored in a non-transitory readable medium.

Figure 21:
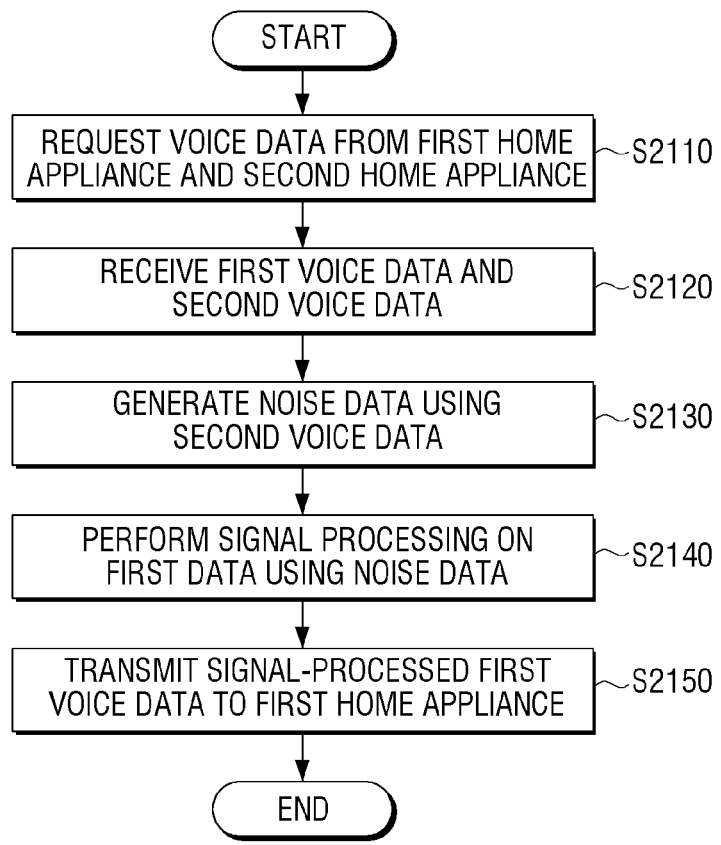
FIG. 21 is a flowchart illustrating a voice recognition method of a server according to an embodiment of the disclosure.

FIG. 21 is a flowchart illustrating a voice recognition method of a server according to an embodiment of the disclosure.

Referring to FIG. 21, first, voice data may be requested from a first home appliance and a second home appliance (S2110). Specifically, a recording request signal for requesting generation and transmission of voice data may be transmitted to the first home appliance and the second home appliance.

In addition, the recording request signal may include information on a predetermined time and information on a predetermined time length. The information included in the recording request signal is not limited to the examples described above.

First voice data and second voice data may be received (S2120). Specifically, the first voice data obtained based on the recording request signal may be received from the first home appliance. The second voice data obtained based on the recording request signal may be received from the second home appliance.

Noise data may be generated using the second voice data (S2130). Here, the noise data refers to sound data corresponding to pure noise of a noise source in the second home appliance.

Meanwhile, a method of generating noise data has been described above, and thus, a redundant description thereof will be omitted.

Signal processing may be performed on the first voice data using the noise data (S2140). Specifically, signal processing for removing a component corresponding to the noise of the noise source included in the first voice data may be performed using the noise data.

The signal-processed first voice data may be transmitted to the first home appliance (S2150).

Therefore, in the voice recognition method of the server of the disclosure, the first voice data is received from the first home appliance which is to perform the voice recognition function, the second voice data regarding the noise or reference data is obtained from the second home appliance that produces large magnitude noise, and preprocessing is performed on the first voice data using the obtained second voice data or reference data, so that the noise included in the voice data may be accurately removed even if the noise is large in magnitude. The voice recognition method as shown in FIG. 21 may be executed on a server having the configuration of FIG. 5 or may be executed on a server having another configuration.

In addition, the voice recognition method as described above may be implemented with at least one executable program for executing the voice recognition method as described above, and such an executable program may be stored in a non-transitory readable medium.

While the disclosure has been described with reference to the accompanying drawings, it is to be understood that the scope of the disclosure is defined by the claims described hereinafter and should not be construed as being limited to the above-described embodiments and/or drawings. It is to be clearly understood that improvements, changes, and modifications that are obvious to those skilled in the art are also within the scope of the disclosure as defined in the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A home appliance comprising:
a microphone configured to obtain first voice data including a voice from a user and noise;
a communication device configured to communicate with another home appliance, wherein the other home appliance includes a motor disposed in a housing of the other home appliance, the motor configured to perform a predetermined function of the other home appliance; and a processor configured to:
  control the communication device to determine whether the noise is produced when the motor in the other home appliance is driven,
  in response to determining that the noise is produced in the other home appliance, receive, through the communication device, second voice data from a microphone disposed in the housing of the other home appliance,
  generate noise data using the second voice data received from the other home appliance, wherein the noise data is motor noise data regarding the motor of the other home appliance,
  perform signal processing on the first voice data using the generated noise data to remove motor noise with respect to the first voice data using the motor noise data,
  perform voice recognition using the signal-processed first voice data based on a driving of the motor of the other home appliance, and
  perform the voice recognition using the first voice data based on the motor of the other home appliance not being driven.

2. The home appliance as claimed in claim 1, wherein the processor is further configured to generate the noise data using at least one of a finite impulse filter (FIR) or an infinite impulse filter (IIR).

3. The home appliance as claimed in claim 1, wherein the processor is further configured to:
  convert the second voice data into a frequency domain; and
  generate the noise data using the converted second voice data and a predetermined transfer function of each frequency band.

4. The home appliance as claimed in claim 1, wherein the processor is further configured to update a method of generating the noise data using at least one of the first voice data, the signal-processed first voice data, or the second voice data.

5. The home appliance as claimed in claim 4, wherein the processor is further configured to generate the noise data using a correlation between:
  at least one of the first voice data or the signal-processed first voice data; and
  the second voice data.

6. The home appliance as claimed in claim 1, wherein:
  the processor is further configured to generate the noise data using filter information for generating the noise data received from an external device through the communication device; and
  the filter information is obtained using an artificial intelligence model included in the external device.

7. A method for voice recognition of a home appliance, the method comprising:
  obtaining, from a microphone, first voice data including a voice from a user and noise;
  determining whether the noise is produced when a motor in another home appliance is driven, wherein the other home appliance includes the motor disposed in a housing of the other home appliance, the motor configured to perform a predetermined function of the other home appliance;
  in response to determining that the noise is produce in the other home appliance, receiving second voice data from a microphone disposed in the housing of the other home appliance;
  generating noise data using the second voice data received from the other home appliance wherein the noise data is motor noise data regarding the motor of the other home appliance;
  performing signal processing on the obtained first voice data using the generated noise data to remove motor noise with respect to the first voice data using the motor noise data;
  performing voice recognition using the signal-processed first voice data based on a driving of the motor of the other home appliance; and
  performing the voice recognition using the first voice data based on the motor of the other home appliance not being driven.

8. The method as claimed in claim 7, wherein the generating of the noise data includes generating the noise data using at least one of a finite impulse filter (FIR) or an infinite impulse filter (IIR).

9. The method as claimed in claim 7, wherein the generating of the noise data includes:
  converting the second voice data into a frequency domain; and
  generating the noise data using the converted second voice data and a predetermined transfer function of each frequency band.

10. The method as claimed in claim 7, further comprising updating a method of generating the noise data using at least one of the first voice data, the signal-processed first voice data, or the second voice data.

11. The method as claimed in claim 10, wherein the updating includes updating a method of generating the noise data using a correlation between:
  at least one of the first voice data or the signal-processed first voice data; and
  the second voice data.

12. The method of claim 7, further comprising receiving filter information for generating the noise data from an external device,
  wherein the generating of the noise data includes generating the noise data using the received filter information, and
  wherein the received filter information is obtained using an artificial intelligence model included in the external device.

13. A non-transitory recording medium storing a program for performing a method for voice recognition, the method in the non-transitory recording medium comprising:
  obtaining, from a microphone of a first home appliance, first voice data including a voice from a user and noise;
  determining whether the noise is produced when a motor in a second home appliance is driven, wherein the second home appliance includes the motor disposed in a housing of the second home appliance, the motor configured to perform a predetermined function of the second home appliance;
  in response to determining whether the noise is produced in the second home appliance, requesting voice data the second home appliance;
  receiving second voice data obtained from a microphone disposed in the housing of the second home appliance based on the request;

generating noise data using the second voice data received from the second home appliance, wherein the noise data is motor noise data regarding the motor of the second home appliance;

performing signal processing on the first voice data using the generated noise data to remove motor noise with respect to the first voice data using the motor noise data;

transmitting the signal-processed first voice data to the first home appliance based on a driving of the motor of the second home appliance; and performing the voice recognition using the first voice data based on the motor of the other home appliance not being driven.

14. The non-transitory recording medium of claim 13, further comprising:

updating a method of generating the noise data using at least one of the first voice data, the signal-processed first voice data, or the second voice data.

* * * * *